(12) United States Patent
Calleija et al.

(10) Patent No.: US 10,772,253 B2
(45) Date of Patent: Sep. 15, 2020

(54) AUTOMATIC TARGET RECOGNITION AND DISPENSING SYSTEM

(71) Applicant: The University of Sydney, Sydney (AU)

(72) Inventors: Mark Calleija, Rydalmere (AU); Salah Sukkarieh, Kogarah (AU)

(73) Assignee: The University of Sydney, Sydney (AU)

( * ) Notice: Subject to any disclaimer, the term of this patent is extended or adjusted under 35 U.S.C. 154(b) by 216 days.

(21) Appl. No.: 15/534,775

(22) PCT Filed: Dec. 10, 2015

(86) PCT No.: PCT/AU2015/000746
§ 371 (c)(1),
(2) Date: Jun. 9, 2017

(87) PCT Pub. No.: WO2016/090414
PCT Pub. Date: Jun. 16, 2016

(65) Prior Publication Data
US 2017/0359943 A1      Dec. 21, 2017

(30) Foreign Application Priority Data
Dec. 10, 2014   (AU) .............................. 2014905005

(51) Int. Cl.
*A01B 79/00*   (2006.01)
*A01M 7/00*   (2006.01)
(Continued)

(52) U.S. Cl.
CPC ............ *A01B 79/005* (2013.01); *A01G 25/09* (2013.01); *A01M 7/006* (2013.01);
(Continued)

(58) Field of Classification Search
None
See application file for complete search history.

(56) References Cited

U.S. PATENT DOCUMENTS

| 6,443,365 | B1 | 9/2002 | Tucker et al. |
| 2003/0187560 | A1 | 10/2003 | Keller et al. |

(Continued)

FOREIGN PATENT DOCUMENTS

| AU | 2009202785 B2 | 11/2014 |
| WO | WO 2014/052536 A1 | 4/2014 |

OTHER PUBLICATIONS

International Search Report and Written Opinion for International Application No. PCT/AU2015/000746, dated Mar. 8, 2016, 9 pages.
Extended European Search Report for Application No. EP 15866521.6 dated Sep. 27, 2018.

*Primary Examiner* — Thomas C Lee
*Assistant Examiner* — Gary Collins
(74) *Attorney, Agent, or Firm* — Wolf, Greenfield & Sacks, P.C.

(57) ABSTRACT

An automated apparatus, method and system for projecting a control agent toward a recognised target for the purposes of agricultural cultivation or environmental management or various other applications; a source of the control agent adapted for use in connection with an environmental control function, an outlet incorporating at least one outlet orifice to direct the control agent emanating from the outlet orifice toward a target. An activation means is movable between an operative mode and an inoperative mode in which the outlet is effectively closed. A targeting mechanism movable on at least one independent control axis provided for selectively orienting the outlet orifice and thereby orienting the control agent in the operative mode. A first sensing system, a classification system, a control system in accordance with a predetermined control logic adapted to deliver doses of the (Continued)

control agent to the identified targets for the purposes of the environmental control function.

19 Claims, 24 Drawing Sheets

(51) Int. Cl.
    *A01M 21/04*     (2006.01)
    *A62C 37/40*     (2006.01)
    *A01G 25/09*     (2006.01)
    *B64D 1/18*     (2006.01)
    *B64C 39/02*     (2006.01)
    *B64D 47/08*     (2006.01)

(52) U.S. Cl.
    CPC ........ *A01M 7/0089* (2013.01); *A01M 21/043* (2013.01); *A62C 37/40* (2013.01); *B64C 39/024* (2013.01); *B64D 1/18* (2013.01); *B64D 47/08* (2013.01); *B64C 2201/12* (2013.01); *B64C 2201/123* (2013.01)

(56) References Cited

U.S. PATENT DOCUMENTS

| | | |
|---|---|---|
| 2004/0030571 A1* | 2/2004 | Solomon ................. F41H 13/00 700/248 |
| 2006/0265106 A1 | 11/2006 | Giles et al. |
| 2009/0100995 A1* | 4/2009 | Fisher ..................... B64D 1/04 89/1.11 |
| 2013/0155672 A1 | 6/2013 | Vo et al. |
| 2014/0180549 A1 | 6/2014 | Siemens et al. |
| 2014/0251123 A1* | 9/2014 | Venema ................... F41G 3/16 89/41.22 |
| 2014/0303814 A1* | 10/2014 | Burema ............... A01B 79/005 701/3 |
| 2015/0027044 A1* | 1/2015 | Redden ................. A01G 22/00 47/58.1 R |
| 2015/0142250 A1* | 5/2015 | Cavender-Bares ...... A01C 7/00 701/23 |
| 2016/0018224 A1* | 1/2016 | Isler ..................... G01C 21/005 701/25 |
| 2016/0157414 A1* | 6/2016 | Ackerman ........... A01B 69/008 701/25 |
| 2017/0112118 A1* | 4/2017 | MacKenzie ........... A01G 22/00 |

* cited by examiner

AUTOMATIC TARGET RECOGNITION AND DISPENSING SYSTEM

CROSS-REFERENCE TO RELATED APPLICATIONS

This application is a national stage filing under 35 U.S.C. § 371 of international PCT Application PCT/AU2015/000746, filed Dec. 10, 2015, entitled "AUTOMATIC TARGET RECOGNITION AND DISPENSING SYSTEM," which claims priority to Australian Patent Application 2014905005, filed Dec. 10, 2014, each of which is incorporated herein by reference in its entirety.

FIELD OF THE INVENTION

The present invention primarily relates to an automated apparatus, method and system for projecting a fluid jet or other control agent toward a recognised target, for the purposes of agricultural cultivation or environmental management.

The invention has been developed primarily for use in the targeted application of irrigation liquids or fertilisers to crops and/or the targeted application of pesticides to weeds, insects or other pests. The invention will be described predominantly in these contexts. It should be appreciated, however, that the invention is not limited to these particular applications, being potentially also adaptable for crop planting, pruning, harvesting, weeding and other analogous purposes. It should also be appreciated that the present invention is also adaptable for a variety of applications other than for agricultural purposes.

BACKGROUND OF THE INVENTION

The following discussion of the prior art is intended to place the invention in an appropriate technical context and enable its advantages to be more fully appreciated. However, any references to prior art throughout this specification should not be construed as an express or implied admission that such art is widely known or common general knowledge in the relevant field.

Various techniques are known for irrigating agricultural crops. One common form involves the use of linear or rotary sprinklers or sprayers. These systems are designed to spray water from a pressurised supply through spray heads of various types into the air in the form of droplets. The droplets then fall to the ground relatively uniformly to irrigate the crops. These "blanket spraying" systems can distribute irrigation water over large areas. However, the distribution is substantially untargeted and as a result, the process is relatively inefficient and the resultant water consumption is relatively high.

Drip irrigation systems are also known, whereby irrigation water is allowed to drip into the soil through fixed networks of pipes, valves, tubes and emitters positioned in the general vicinity of the crops. These systems can be somewhat more targeted in the application of irrigation liquids and fertilisers and can reduce water consumption to some extent. However, the infrastructure is costly to install and maintain, and water consumption on commercial scale agriculture is still relatively high.

Both sprinkler and drip irrigation systems are sometimes used to deploy fertilisers, pesticides and similar chemicals intended to either promote the growth of the target crops or impede the growth of weeds, pests or diseases. Again, however, because these application systems are relatively untargeted, large quantities of fertilisers or pesticides are required and a significant proportion is inevitably wasted.

In an attempt to ameliorate these problems, other techniques such as tractor-drawn sprayers, aerial application spraying ("crop dusting"), and even semi-automated techniques using unmanned aerial vehicles (UAVs) have been used. In all such cases, however, the targeting is at best approximate, with significant quantities of over-spray of costly agricultural chemicals being inevitably dispersed as either airborne droplets, or liquid run-off, with minimal impact.

In many circumstances, using any of these known delivery mechanisms, only a proportion of the irrigation water, or chemical fertiliser or pesticide, is delivered precisely where needed. Aside from the significant cost resulting from this wastage, the environmental effects may be negative, for example if potentially toxic airborne pesticides are inadvertently blown into populated areas under adverse wind conditions, or if chemical run-off works its way into river systems or water supplies. These considerations in turn impose limitations on the types and quantities of agricultural chemicals that can be used.

In an attempt to ameliorate some of these problems, techniques have been proposed whereby a more concentrated jet of water or other liquid is shot more directly at the target plants. However, the nozzles of such systems are usually fixed in position, as a consequence of which the water or other liquid can only be dispensed at a point in time when the nozzle is oriented correctly toward the target. In other words, there is only a single solution to the targeting problem. In an attempt to overcome this limitation and increase the resolution of such systems, it has also been known to include a number of independently operable outlet nozzles along the length of an extended boom or spray bar. However, this significantly increases cost, size, weight and complexity of the apparatus. These factors also render the system impractical in many mobile applications, particularly airborne vehicular applications.

It is an object of the present invention to overcome or ameliorate one or more disadvantages of the prior art, or at least to provide a useful alternative.

SUMMARY OF THE INVENTION

Accordingly, in a first aspect, the invention provides an apparatus for projecting a fluid toward a target, the apparatus including:

a fluid inlet for connection to a source of pressurised control fluid adapted for use in connection with an environmental control function;

a fluid outlet incorporating at least one outlet orifice adapted to direct the pressurised control fluid emanating from the outlet orifice toward a target as a jet;

activation means selectively movable between an operative mode in which the fluid outlet is effectively open and an inoperative mode in which the fluid outlet is effectively closed;

a targeting mechanism including an outlet support assembly movable on at least one independent control axis for selectively orienting the outlet orifice and thereby orienting the jet of control fluid in the operative mode, the targeting mechanism further including one or more actuators to effect movement of the outlet support assembly about the control axis;

a first sensing system for sensing aspects of an environment and generating data indicative thereof;

a classification system for identifying targets within the environment on the basis of the data from the sensing system; and a control system adapted to orient the outlet orifice toward the targets by means of the targeting mechanism and to activate the jet of control fluid by means of the activation means in accordance with a predetermined control logic;

thereby to project jets of the control fluid toward the identified targets for the purposes of the environmental control function.

Preferably, the outlet support assembly is movable on at least two independent control axes, whereby the actuators effect movement of the outlet support assembly about the respective control axes.

Preferably, the activation means include a control valve. The apparatus further includes a fluid storage reservoir connected to the fluid outlet and an associated fluid pressurisation system.

In one embodiment, the fluid pressurisation system includes a pump, optionally contained within the fluid storage reservoir. In another embodiment, the fluid pressurisation system includes a source of compressed gas connected to the fluid storage reservoir, thereby to propel the control fluid from the reservoir to the fluid outlet, in response to the activation means. In some embodiments, the source of compressed gas is a pressure vessel, optionally associated with a compressor. In some embodiments, the fluid storage reservoir and the pressure vessel may be effectively integrated into the same containment vessel. In one such embodiment, the integrated fluid storage reservoir and pressurisation system take the form of an expandable bladder, optionally within a surrounding containment vessel.

In some embodiments of the invention, the fluid is a liquid. In the context of this invention, the control fluid is not intended to be limited to a liquid or a gas, but in other forms may be any suitable flowable substance such as particulate or granular matter, including, for example, powdered, seeded, pellet or pollinator material, adapted to be entrained into a jet stream by means of the activation mechanism (e.g. by way of a venturi effect or compressed/forced air shots). In one preferred embodiment, the environmental control function is the growth of a selected agricultural plant or crop. In one form of this embodiment, the control fluid is water for irrigation or a liquid fertiliser to enhance growth, and the targets are the plants themselves, or the soil immediately below or surrounding the plants. For particular applications, the targets more specifically may be the foliage, base of the root system, stem, flowers, fruit or vines of the plant.

In certain embodiments, the control fluid includes an organic system with organic matter or life forms such as, for example, insects. In other embodiments, the control fluid includes non-organic systems such as, for example, nanorobots. In such embodiments, the organic and non-organic systems are intended to interact with the target for the purposes of the environmental control function.

In another form of this embodiment, the control fluid is a pesticide for killing weeds that would otherwise impede plant growth, and in that case the targets are the weeds. In a further variation, the pest may take the form of a fungal infection or other plant disease, and the control fluid may take the form of a fungicide or other suitable pesticide or treatment in liquid form, targeting visual or other indications of plant infection.

In another variation, the targeted agricultural pests may be insects or other ecto- or endo-parasitic animals such as locusts, nematodes, moths, molluscs, mites, ants, beetles, centipedes, millipedes or the like and again, the control fluid may include a liquid pesticide adapted to selectively eradicate, or at least control the population of, such pests when targeted. In one application of the invention, the targeted pest is a plant-parasitic nematode, and the control liquid includes a nematodicide.

In another variation, the control liquid is an emulsion or suspension. For example, in one form an oil-based emulsion as distinct from a herbicidal or pesticide is used, whereby pests such as mites or insects are effectively smothered in oil once the carrier liquid in the emulsion, such as water, evaporates. In such embodiments, the emulsion may be pre-mixed, in which case the liquid storage reservoir may optionally include a stirring mechanism to maintain relatively uniform distribution of the constituent components in the emulsion. Alternatively, two or more separate reservoirs may be provided for operation in conjunction with an in-line dynamic mixing chamber or emulsifying mechanism. In one form, the in-line mixing chamber for the emulsion may be effectively integral with the dispensing valve or outlet nozzle. In one application of this embodiment, the control liquid is a mixture, emulsion or suspension of a carrier liquid and a pollen or pollinating agent, whereby the targets are plants of particular species to be pollinated and the apparatus is adapted for use as an automated robotic pollination mechanism.

In a further variation the pests, whether plant or animal in form, may be effectively eradicated or displaced by the energy of the control liquid as distinct from its chemical composition. For example, in some embodiments, the energy of the targeted water jet itself is used to eradicate weeds or animal pests. In one variation, the water jet is used to cut the stems of targeted weeds, and thereby effectively remove the weeds by a form of water jet cutting.

In a further variation of this form of the invention, the kinetic energy of the jet of control liquid, typically water, may be used to physically sever the stems of target plants, as a means of systematically pruning, trimming, thinning, edging or harvesting the target plants or crops. In some embodiments, the kinetic energy of the fluid may be used to blast the target. In these embodiments, an abrasive medium (e.g. garnet) may be fed into the control fluid to assist in severing or cutting the target. In other embodiments, the thermal energy of the fluid may be used to eradicate the targets (e.g. using boiling water or steam to erase weeds or pests). In some embodiments, the fluid may be an oil such as, for example, vegetable, olive, canola, and coconut. Preferably, the oil is organic. In certain applications, oil with a substantially higher boiling point compared to water may be more effective in eradicating the targets (e.g. weeds). In yet further embodiments, salts and/or organic acids such as vinegar may be used as, or within, the control fluid when targeting weeds.

In some preferred methods of operation, during each firing sequence, the operative mode of the activation mechanism is relatively short in duration, such that the jet takes the form of an airborne slug or "projectile" of the control liquid. In one variation, multiple liquid projectiles may be released in rapid succession. In other modes of operation, each firing sequence is substantially longer in duration, such that the jet in each firing sequence takes the form of a semi-continuous stream of control liquid, which continues to flow until the control valve of the activation means is closed at the completion of that sequence.

Preferably, the apparatus includes a second sensing system for sensing in real time the position and orientation of the fluid outlet orifice, as part of a feedback control loop. In other embodiments, however, it will be appreciated that these parameters may alternatively be determined or calculated by means of an open loop control strategy, optionally utilising pre-defined intermediate reference or waypoints for actuators regulating the position of the outlet support assembly.

In one embodiment, the fluid outlet orifice is generally circular in cross-sectional profile. In other embodiments, however, a variety of alternative shapes and configurations may be utilised. For example, in one embodiment, the orifice is rectangular in cross-sectional profile, such that the resultant jet of control liquid adopts a corresponding elongate profile, in the form of a liquid sheet. This configuration may be advantageous, for example, in targeting and severing the stems of plants, whether for removal of weeds or harvesting of plants or crops.

In yet another variation, the energy of the jet of control liquid may be used to displace soil and thereby form a planting hole in a soil bed, and the same liquid jet or a different fluid jet utilised simultaneously or subsequently to deliver one or more seeds into the hole, through the same or a different outlet orifice, to facilitate automated planting of crops. In a similar way, the energy of the liquid jet may be used in some embodiments to form continuous furrows in soil beds to facilitate subsequent manual or automated seed planting.

In some preferred embodiments, the apparatus includes a seed-feeding mechanism. In one form, the seed feeding mechanism is adapted to introduce seeds into the fluid jet, whereby the liquid jet or projectile is used as the delivery mechanism and optionally also the planting mechanism. In some embodiments, the seeds may be mixed with the control liquid within the reservoir, or stored in a separate container, compartment or reservoir and combined with the control liquid as a carrier liquid prior to delivery. In another form, the seed feeding mechanism is adapted to introduce seeds into the soil bed, independently of the delivery mechanism for the control liquid. In a similar way, the control liquid may be used as a carrier for targeted delivery of active components in solid or semi-solid form, such as fertilizer pellets sized to pass readily through the outlet orifice and adapted for sustained release of active constituents post-delivery. In some embodiments, the control fluid in the form of a liquid or gas may be used to fire solid pellets, granules, particulates or seeds toward the target, without the control fluid itself needing to reach the target.

In one embodiment, a plurality of orifices are incorporated into the fluid outlet. These orifices may be arranged collectively to form a combined sheet or wall of control liquid for purposes similar to those described above, in situations where it is more efficient or effective to project a composite jet with a larger overall effective cross-sectional profile. In variations of this embodiment, different orifices may be adapted to deliver different control liquids. For example, one orifice may be adapted to deliver a first liquid such as water for irrigation, while a second orifice may be adapted simultaneously or sequentially to deliver a second liquid such as fertiliser or pesticide.

In such embodiments, the targets for the respective orifices may also be different. For example, in one form, the first orifice is used to target plants with irrigation liquid or fertiliser thereby to enhance growth, while the second orifice is used to target weeds or other pests with herbicides, pesticides and/or high-energy jet streams for the purpose of eradication. In another variation, the multiple orifices may be targeted and activated simultaneously, thereby to deliver increased dosage levels of the same control liquid, or simultaneous dosages of complementary liquids, to the same location, as and when required. In a further variation, the multiple orifices may be adapted to be targeted, oriented and activated independently of one another, utilising independent targeting mechanisms. For example, the apparatus may be configured as a multi-head system with a plurality of independent outlet orifices adapted to deliver either the same or different dedicated control fluids for either the same or different specified targets. In some forms, the classification system may be adapted to provide a discriminating functionality or decision making capability to determine and distinguish one target species from another, and thereby subsequently enable determination and selection of the desired output orifice (e.g. based on position) and/or the desired control fluid to be fired at the identified target (e.g. water or pesticide) and/or the required quantity of control fluid.

In some embodiments, one or more characteristics of the jet is selectively variable including, but not limited to, the quantity, volume, temperature, and pressure, thereby selectively varying the dosage for a particular target and/or based on data from the sensing system. In this way, the apparatus is able to automatically or manually vary the amount of fluid dispensed based in a controlled and targeted manner. For example, if the system is assigned a weeding task, the control system may be adapted to determine the quantity of herbicide to dispense on each target, the quantity preferably being estimated based on the identified information of that target (e.g. identified and classified by the first sensing system and classification system, respectively). In certain embodiments, the dispensed amount of herbicide may be proportional to the identified volume or area of the target. Alternatively, the variable fluid dose quantity may be based on predetermined features of the target such as, for example, one particular type of weed may in general require a larger dose than another type of weed, and the system can be configured to automatically vary the dosage based the identification and classification of the target. Similarly, in other forms, the apparatus may be adapted to control the temperature of the fluid for thermal weed control, or the velocity and pressure of the fluid for kinetic energy control.

In one embodiment, the apparatus is attached to or integrated with an unmanned aerial vehicle (UAV), the control of which may be partly or fully automated, as part of an overall route planning, environmental scanning and targeting control methodology, optionally operating systematically in conjunction with a plurality of like or complementary autonomous vehicles.

In another embodiment, the apparatus is attached to or integrated with a mobile ground-based vehicle, for example of the type adapted to traverse successive rows of crops. Similarly, the control of this vehicle may be partly or fully automated, as part of an overall route planning, environmental scanning and targeting control methodology, and again optionally operating systematically in conjunction with a plurality of like or complementary autonomous vehicles.

In other embodiments, the apparatus is attached to or integrated with a tethered aerial or ground-based vehicle. Again, the control of the tethered vehicle may be partly or fully automated, as part of an overall route planning, environmental scanning and targeting control methodology, and again optionally operating systematically in conjunction with a plurality of like or complementary vehicles. In some embodiments, the tether may be used for the purposes of spatially constraining a UAV and/or for energy delivery, communications and delivery of the fluids or other particulates to be used for the applications of the control fluid. In various embodiments, the tether has a base which may be directly or indirectly integrated with either fixed infrastructure (e.g. a building, pole or tower) or with a mobile vehicle (e.g. a ground vehicle). Preferably, the tether includes a tether control means for managing or controlling operation of the tether such as, but not limited to, a motorised spool, and supporting hardware including encoders, slip rings, etc.

In a further embodiment, the apparatus may be attached to a fixed base station, optionally in conjunction with a plurality of like base stations disposed in predetermined spaced apart relationship with adjoining or overlapping target areas and operating in concert to provide effective coverage of a defined area.

In some embodiments, the targeting mechanism includes additional degrees of freedom, to provide more flexibility for positioning and orienting the fluid outlet. For example, in one embodiment the outlet support assembly of the targeting mechanism may be adapted for movement around additional rotational control axes, and/or along translational control axes.

In one such embodiment, the outlet support assembly is the end effector of a multi-DoF (multiple degrees of freedom) robotic arm, with the robotic arm providing at least one kinematic degree of freedom at each of a plurality of revolute joints, connected by intermediate links. In some embodiments, the robotic arm itself may comprise the outlet support assembly and the associated targeting mechanism. The additional degrees of freedom are particularly advantageous in embodiments adapted for harvesting plants, for example, by allowing the stems to be cut by the water jet mechanism from below the plant foliage, thereby avoiding inadvertent damage to the foliage. Such embodiments may also be adapted for harvesting plants, such as asparagus, that need to be cut close to the ground.

In one embodiment, a sensor of the first sensing system is substantially co-located with the fluid outlet such that a ray projected from the sensor is substantially co-linear with the liquid projectile path. In certain embodiments, the sensor or sensors may be fixed relative to an axis of one or more of the actuators, or at a predetermined reference or base point on or relative to the apparatus. In various embodiments, the sensors may be passive or active.

In some embodiments, the sensor comprises a camera adapted to generate a 2-D image of the environment, and the control system includes a mathematical transformation algorithm to correlate the pixel space of the image from the camera to the positions of the actuators in the targeting mechanism and/or robotic arm. More sophisticated embodiments utilise 3-D imaging and multi-modal sensing for mapping and localisation. Examples of sensors that may be used for mapping and localisation include infrared, ultraviolet, visual, laser ranging or Lidar, hyperspectral, inertial, acoustic and radar-based sensing systems.

In some embodiments, a targeting calibration routine may be required. In one preferred routine, the apparatus initially shoots a projectile at a calibration target. The area where the fluid makes contact with the calibration target is then sensed using imaging sensors and this data is fed into the calibration system. The calibration system then determines the difference between the desired and actual strike areas, to discern the state of the system, and the direction and magnitude of error correction required. This process may be repeated several times and at various points within the actuation and sensing space as required, in order to calibrate the system to within defined tolerances. This routine may be run live, in real time on actual targets, or as a dedicated calibration process prior to deployment on actual targets. In some embodiments, the initial calibration shots are dispersed in a manner so as to form a predetermined pattern or grid in a calibration target area, region or zone (e.g. checkerboard, corners of an image, etc).

In other embodiments, passive calibration routines may be implemented for an imaging camera, for example using a calibration image of known geometry, such as a checkerboard pattern. These calibration routines can be used to provide the requisite mapping from pixel space (for example pixel x and y coordinates) to actuator space (for example i and j or pan/tilt coordinates).

Manual calibration routines are also envisaged, whereby for example, the targeting mechanism may be manually positioned such that the liquid jet stream hits one or more target objects of known position in the sensed image (for example target objects at the corners of a rectangle) thereby to permit generation of a map correlating pixels with joint angles.

In one preferred embodiment, the control liquid has high contrast characteristics, so as to be readily sensed by the imaging sensors (which may operate in the ultraviolet, visible, infrared, or other spectrums). In one embodiment, additives such as visual or UV colourings are used, so that compatible sensors can readily discern the fluid strike area from the surrounding environment. In other embodiments, the control liquid may be heated or cooled to enhance contrast in the infrared spectrum relative to the surrounding environment, thereby facilitating accurate detection by infrared sensors.

Preferably, the control system includes a prioritisation algorithm for prioritisation of targets for the apparatus. In one embodiment, the algorithm is based on a relatively simple "first-in-first-out" (FIFO) prioritisation strategy. In other embodiments, however, additional optimisation parameters may be incorporated into the control strategy, including angle of attack, vehicle velocity, time or distance required for the targeting mechanism to reach firing position, projectile travel distance, errors in measurement, historical inputs derived from historical system performance in comparable situations, estimated probability of a missed target (e.g. based on range, wind conditions, potential obstacles and other measured or calculated variables), related consequences (e.g. inadvertently hitting a neighbouring plant rather than a targeted weed with pesticide), opportunity value parameters, or the like. In some embodiments, multiple projectiles or jets may be fired at a target across a predetermined distribution range. In certain embodiments, the jets may be fired in a randomised or stochastic approach where each target is shot multiple times within the predetermined distribution range.

The control system preferably also includes a strategy for global registration, whereby global coordinates of each target are estimated using one or more sensors. In some embodiments, this strategy records a centre position or outline for each target that has been fired at, and verifies that any subsequently identified target is beyond a predetermined minimum distance, (for example, an error or exclusion zone defined within an error circle, ellipse or other geometrical boundary) from targets that have previously been "shot", with potential targets within those zones being disregarded in favour of the next target. In some embodiments, the dimensions of these error or exclusion zones are fixed, or adjustable, around the recorded or calculated centre position for each target.

In more sophisticated embodiments, the control algorithm preferably includes a methodology for dynamically determining, assigning and storing for each target a unique error or exclusion zone, based on real-time data relating to specific inputs such as errors in imaging, real time kinematic (RTK) data, ranging data, and the like.

In even more sophisticated embodiments, the state information of the features in the environment are incorporated into a world map, which includes dimensions such as mapping, localisation, feature classification (weeds, crops etc), feature states (such as what has been shot at, how much fertiliser has been applied, etc) error estimation, exclusion zones and/or memory of previous world maps or parts thereof. It will be appreciated that such sophisticated intelligent path planning and control methodologies of the support vehicle may advantageously enable automatic geometric marking and mapping to facilitate more complex and elaborate shooting trajectories. In one form, the world map is in the form of a mathematical model established using statistical filtering and estimation techniques based on input from the sensors (e.g. camera, IMU, laser rangefinder). In certain preferred forms, the world map can be modified or updated through the use of information sharing (e.g. robot to robot, robot to cloud, robot to base etc). For example, data fusion (e.g. SLAM) and representation techniques may be used to cooperatively generate the world map, together with localisation information that can be accessed by other agents (i.e. agents other than the robot used for the initial data capture).

In some embodiments, multiple robots are networked and configured to communicate with a central control system, which is adapted to store state information and generate higher level plans. Another variation utilises a decentralised system, wherein multiple robots can communicate and coordinate directly between themselves, thereby obviating the need for a central control system.

In some embodiments, the targeting mechanism, optionally including a robotic arm and/or a supporting vehicle as described above, incorporates multiple redundant degrees of freedom, to provide additional flexibility in terms the spatial location of the fluid outlet upon delivery of each jet or shot, the orientation of the outlet orifice in that position, and the path from that position to the next firing position. Preferably, there is a synergy or cooperation between the various individual systems (e.g. robotic arm, ground vehicle, aerial vehicle, automatic targeting system). For example, a ground based vehicle platform can make decisions about revisiting spaces or slowing down/speeding up, depending on the information communicated from the automatic targeting system or apparatus. It should be appreciated that, in certain embodiments, the ground, aerial or manipulation platforms are not merely vehicles/systems for mounting the automatic targeting system, but rather are intended to be part of a complete and cooperative system with shared goals, missions and status information. Similarly, a remote aerial vehicle may be adapted to facilitate communication of information to a ground based vehicle. This may be particularly useful when targeting weeds over large areas, since an aerial vehicle can cover relatively large areas from an advantageous vantage point for identifying targets, thereby enabling the information to be shared either in real time, or subsequently, to the ground based vehicle which can then proceed directly to the targets without conducting an exhaustive search process.

In further aspects, the invention provides an automated method and system for projecting a fluid stream or jet toward a recognised target, for the purposes of agricultural cultivation or environmental management, using the apparatus and system as described. In yet other aspects, the invention provides methods of agricultural cultivation or environmental management based on the automated targeting and projection of a fluid stream or jet using the apparatus, method or system as described.

In some embodiments, the targeting mechanism and sensing systems are exposed to the environment without any coverings. In other embodiments, the targeting mechanism and sensing systems are at least partially housed within an enclosure thereby protecting the housed components from collisions, water, debris, dust, dirt, sunlight, or the like. In certain embodiments, the enclosure includes a box-like cover member having one or more openings through which the targeting mechanism or sensing systems can pass. Preferably, the enclosure has an access door, window or panel. In some embodiments, the internal volume of the enclosure is pressurised with air or other suitable gas, whereby a positive pressure assists in expelling dust from, or inhibiting dust from entering, the enclosure. In some embodiments, the temperature and/or humidity of the internal volume of the enclosure may be controlled.

In some embodiments, the data from the sensing system may incorporate noise and may be acquired at relatively sparse intervals in time, while the actuation system is capable of operating at a relatively high speed and with relatively high precision by means of implementing one or more state estimation algorithms or noise filters on the data from the sensing system data. These algorithms and filters may include one or more conventional statistical filtering and estimation techniques (e.g. particle filter, Kalman filter or Bayes estimator). For example, the images captured from a camera operating at a 1 Hz frame rate may be used as the input to a tracking algorithm or filter so that the targeting mechanism is able to estimate the locations of targets at any point in time, and potentially at much higher rates (e.g. 10 Hz-1000 Hz) than the 1 Hz frame rate. It will be appreciated that, due to the potentially high speed at which the system can automatically locate and shoot targets, various software or electrical based controller strategies (e.g. PID, LQR, NLQR etc.) may be implemented in order to facilitate rapid and precise targeting. Similarly, a time-optimised servo-mechanism control may be implemented as a control methodology for the actuators to facilitate smooth, rapid, accurate and precise targeting. Other mechanically analogous controller counterparts may also optionally be used to facilitate the control problem of the end effector (e.g. oil dampers, springs, magnetic dampeners, aerodynamic dampeners, counterweights, inertial and balancing masses).

In some embodiments, the state estimation task can potentially be simplified by making assumptions on the operative environment, including acceleration, velocity, distance, or other geometric constraints. For example, with one variable spatial dimension and assuming that, at time (t), a vehicle is travelling in a straight line at a constant velocity (v) relative to the location (x) of a target, then at time (t+$\Delta$t) the location ($x_1$) of the target can be estimate by the formula: $x_1$=x+ ($\Delta$t*v). Similarly, in situations with varying velocity, the displacement can be determined as the integral of velocity over time. The estimation methodology can be readily applied in two or three dimensions, optionally with additional constraints to estimate the location of targets at any point in time with some degree of certainty (i.e. between information capture points such as, for example, camera frame acquisition, laser data acquisition, navigation data acquisition). In some embodiments, the state estimation task is adapted to orient the actuators at particular joint angles determined to enable the jet to hit a target (i.e. such that the nozzle is pointing in a specified orientation at a specified time, as determined by way of the state estimator and planner, so that the projectile and the target meet or collide, as planned). In certain embodiments, the state estimation task may be able to determine if the actuators will be late arriving at the required joint angles, whereby the system can abort and re-plan without shooting the target. In such cases, a missed target occurrence rate can be determined and used as feedback for the overall control system (e.g. velocity of the ground vehicle) or the actuator control system planner (e.g. transit time, velocity, acceleration and latency characteristics of the actuators) to slow down the process and give the actuators more time to achieve their plans. Similarly, if the actuators are determined to be waiting for excessively long periods of time, in a ready state, before firing, this information or data can be used by the feedback control loop, whereby the speed of movement can be increased by the control and planning system to further optimise the operation.

In some embodiments the sensing system is mounted (e.g. on a boom pole or similar, and optionally telescopically extensible) so as to be spaced from the shooting system (e.g. nozzles, actuators) by a predetermined distance to allow for increased computation time by the sensing, classification, and/or control systems of the apparatus. For example, if a vehicle is travelling over a crop at a specified velocity (e.g. 1 m/s) such that the total time taken from image acquisition to target identification and localisation is 1 second, then ideally the sensing system would be positioned 1 metre ahead of the shooting system whereby the shooting system is better positioned at the time of actuation. In other embodiments, the images, sensing data and target identification requirements can be communicated to remote computers (e.g. over network to supercomputers, internet to cloud computing etc.) for high speed image processing, thereby reducing or eliminating any requirement for high power on-board computing.

In some embodiments, the system operates in a generally unsupervised manner where the operator is able to issue high level commands to the system. An example of such a high level unsupervised task may include: (1) maximise yield of a farm by pollinating the flowers, including rules defining an allowed time to be taken and amount of pollen used; (2) maximise yield on the farm by weeding, including rules for the allowed time to be taken and an amount of herbicide used. The intention is that these high level commands would generally be issued through devices, preferably wireless devices, such as tablets, computers, and telephones, which can optionally be operated through gestures such as voice commands.

In other embodiments, the system operates in a generally supervised nature where the operator is able to govern the decision process for actions by the system. Examples of such supervised tasks may include: (1) a farmer teaching the system through a visual display of the type of weeds to be eradicated with a given pesticide; (2) a farmer teaching the system, through voice commands, details of the parameters that make up an apple (i.e. a definition of what is and what is not an apple) in real-time as the apparatus or system approaches each target. It is envisaged that a supervised method such as this will, overtime, ultimately converge towards an unsupervised method (i.e. through training and learning algorithms). For example, the operator may be able to assess when the robot reaches a certain predetermined level of accuracy in its decision making capabilities in a supervised learning method, and decide if and when a change can be made to operate under less or no supervision in the decision making process.

In some embodiments, targets are discriminated from non targets through classification techniques involving a machine vision feature recognition methodology based on, for example, size, colour, shape, texture, etc. For example, an NDVI (Normalized Difference Vegetation Index) may be used to discriminate between vegetation and non vegetation, whereby, when spraying fallow ground or crops, the NDVI may be used to find all vegetation, then the centres of each detected target object may be used as the target point. In certain embodiments, the feature recognition methodology may be used as part of a machine learning system or algorithm to determine the likelihood of a target versus a non-target for each object. This likelihood distribution may then be used as part of the overall control strategy for the apparatus.

In certain embodiments, the classification accuracy of the machine vision system may need to be higher than in other embodiments. For example, if the machine vision system is able to correctly classify 99% of targets (e.g. weeds) but incorrectly classifies 10% of non-targets as targets (e.g. crop as weeds) then using a non-selective weeding method such as glyphosate or boiling water will result in 99% of targets killed, with 10% of useful crop also killed which may result in economically poor operations. However, if in the same example the non-selective weeding method is replaced with a selective method (e.g. selective herbicide), then 99% of the targets are still killed, but the 10% of non-targets would not be killed. Alternatively, in order to successfully implement a non-selective method, the accuracy of the classifier may need to be configured to be substantially higher for particular applications, to thereby provide improved overall economical results for the operator.

In other embodiments, a systemic control fluid (e.g. glyphosate, fertiliser) for weeding or fertilising is used such that only a relatively small part or portion of the target needs to be hit in order to completely control the target, as compared to other embodiments employing a contact control fluid where substantially the entire target needs to be hit in order to be effective.

In other embodiments, known prior locations of targets or non-targets (e.g. of crops through manual or automated seeding, hand labelling) is used in conjunction with accurate localisation methods (e.g. RTK GPS, SLAM etc.) in order to know the future positions of these objects. For example, if all seedling positions of a crop are known, then the classification of the crop by the robot can be simplified using these known prior locations. For example, if there is an NDVI image of all vegetation in a scene, region or zone, the connected vegetation at or near the known locations of objects (e.g. crop seedling centre position) can be subtracted from the image, thereby leaving the rest of the NDVI image showing all other vegetation that is not connected, or adjacent, to the prior known locations. This may be particularly useful for determining the locations of weeds in a crop by: taking an NDVI image, removing all crops connected to known locations from the image on the basis that they are known to be vegetation, identifying everything else in the image as a weed. In some embodiments, a radius or other uncertainty profile or shape (e.g. ellipse) may also be used to account for errors in measurement or growth variations such as, for example, the crop not sprouting exactly where the seed was planted.

In further aspects, the invention provides an automated method and system for projecting a fluid stream or jet or other control agent toward a recognised target, for purposes other than agricultural cultivation (e.g. controlling fires, painting, cleaning, etc). It will be appreciated that in such embodiments, the target is selected as any desired target (i.e. not limited to insects, crops, plants, vegetation or weeds, etc) which is intended to be eradicated, modified, or manipulated by application of the fluid stream or jet or other control agent.

Accordingly, in some preferred embodiments, the apparatus and associated systems is adapted to identify and target fires, with a view to extinguishing or controlling the fires through application of the jet. Such a system may preferably incorporate an infrared sensor to determine regions of heat (e.g. fires) as the targets. In this embodiment, the system may also be able to identify and classify different types of fire (e.g. oil, electrical, gas) and automatically apply the appropriate fluid for extinguishing that particular type of fire. In this example, the system may include various nozzles and/or hold a selection of two or more types of fluid so that the most appropriate type of fluid for the identified target fire can be automatically determined, selected and dispensed based on pre-defined rules (e.g. wet chemical for cooking oils and fats, powder ABE for flammable and combustible liquids, etc). Preferably, the system is also able to determine the quantity to dispense based on real time sensing of, for example, estimation of the growth or travel direction of the target fire. Preferably, the system is also able to communicate information to operators or to emergency services with details of the fire (e.g. type, size, location), and may be adapted to enable a remote operator to override the autonomy of the sensing or actuation systems, when required (e.g. fire crews may be able to connect to the system over the internet to gain control of the sensing and actuation systems etc, to thereby manually control the manner in which the fire is to be extinguished).

In other preferred embodiments, the system is adapted to identify and target walls or other surfaces with a view to painting through application of the fluid jet or spray. Such a system preferably incorporates several sufficiently collated nozzles to dispense different colours of paint (e.g. 3 nozzles for red, green and blue, 4 nozzles for cyan, magenta, yellow, black etc.) or a single nozzle in order to automatically paint a surface. For example, the system may be adapted to scan a wall and determine the desired colour to dispense or fire, and/or determine the shape/contour/profile to dispense or fire on a specified or predetermined zone or region of the wall based on the colour and shape detected. In such embodiments, the sensing system may use visual feedback to determine and control the appropriate coverage of the wall, or region of the wall. By way of further example, in certain embodiments, the system may be adapted to paint or erase entire road lines/markings automatically, or instead complete or fill in lines/markings on the road where detected gaps are identified in the lines/markings. In other applications, the system may be adapted to automatically sense, target and remove undesirable markings (e.g. graffiti) on a wall, road or other surface, by dispensing a cleaning or abrasive agent or fluid.

In some embodiments, one or more systems of the apparatus include, or are adapted to be controlled by, an electronic hand held device (e.g. smartphone, tablet, etc). In certain embodiments, the system includes a smartphone and an accessory adapted to be releasably attached to the smartphone for communication therebetween, the accessory being configured to have actuation and dispensing capabilities. In such embodiments, one or more components of the smartphone can be used as part of the apparatus/system, including the battery/power system, display, computing, communications, lighting, audio, sensing (e.g. camera, IMU, touchpad, voice recognition). The additional accessory with components for actuation and dispensing (e.g. motors, nozzle, tanks, pumps etc) may be connectable to the smartphone either by a cable or wire (e.g. cable with USB plugs or the like), or wirelessly (e.g. Bluetooth, WiFi etc). It is envisaged that, in such embodiments, the accessory can be configured to be a relatively small and compact unit, whereby it can be attached to the smartphone with minimal disruption to the operative modes of the phone.

In further aspects, the invention provides an automated method and system for projecting a control agent (other than a fluid) toward a recognised target, for a range of environmental management applications, including but not limited to those applications as described herein (e.g. agricultural cultivation, environmental management, non-agricultural applications, fire control, painting, cleaning, etc).

Accordingly, in a further aspect, the invention provides an apparatus for projecting a control agent toward a target, the apparatus including:

a source of the control agent adapted for use in connection with an environmental control function;

an outlet incorporating at least one outlet orifice adapted to direct the control agent emanating from the outlet orifice toward a target;

activation means selectively operable between an operative mode in which the outlet is effectively open and an inoperative mode in which the outlet is effectively closed;

a targeting mechanism including an outlet support assembly movable on at least one independent control axis for selectively orienting the outlet orifice and thereby orienting the control agent emanating from the outlet orifice in the operative mode, the targeting mechanism further including one or more actuators to effect movement of the outlet support assembly about the control axis;

a first sensing system for sensing aspects of an environment and generating data indicative thereof;

a classification system for identifying targets within the environment on the basis of the data from the sensing system; and a control system adapted to orient the outlet orifice toward the targets by means of the targeting mechanism and to activate the control agent by means of the activation means in accordance with a predetermined control logic;

thereby to project a beam or a jet of the control agent toward the identified targets for the purposes of the environmental control function.

In some preferred embodiments, the control agent is a form of radiation, preferably electromagnetic radiation. In certain embodiments, the radiation is provided by a light source or a microwave source. In some embodiments, the light source is a laser.

In other embodiments, the control agent includes a fluid (i.e. a liquid and/or a gas). In certain embodiments, the control agent includes solid matter, preferably particulate matter.

Preferably, the beam of control agent is projected for a predetermined period of time.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
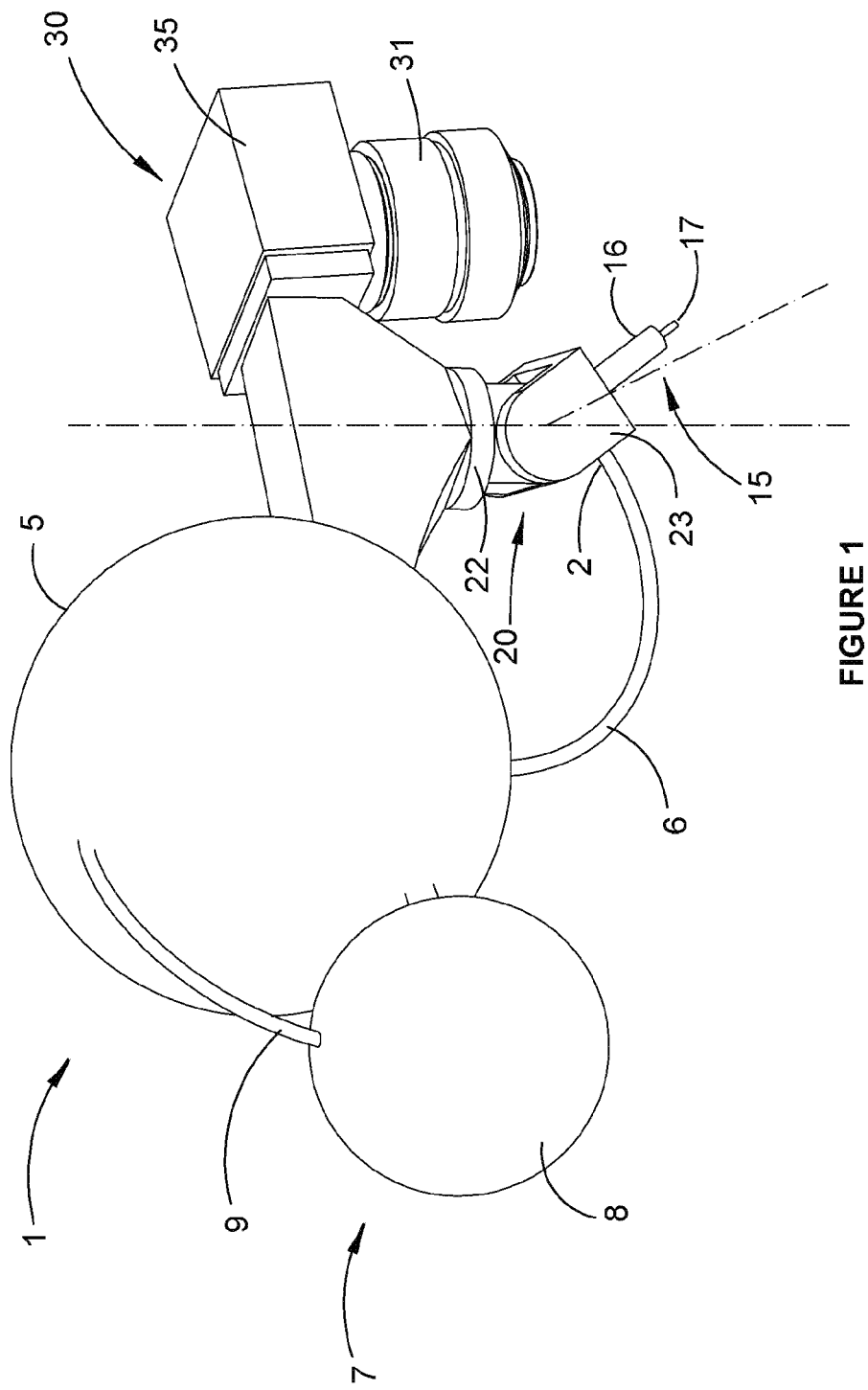
FIG. 1 is a perspective view of an automated target recognition and fluid projectile dispensing apparatus according to a first embodiment of the invention.
Figure 2:
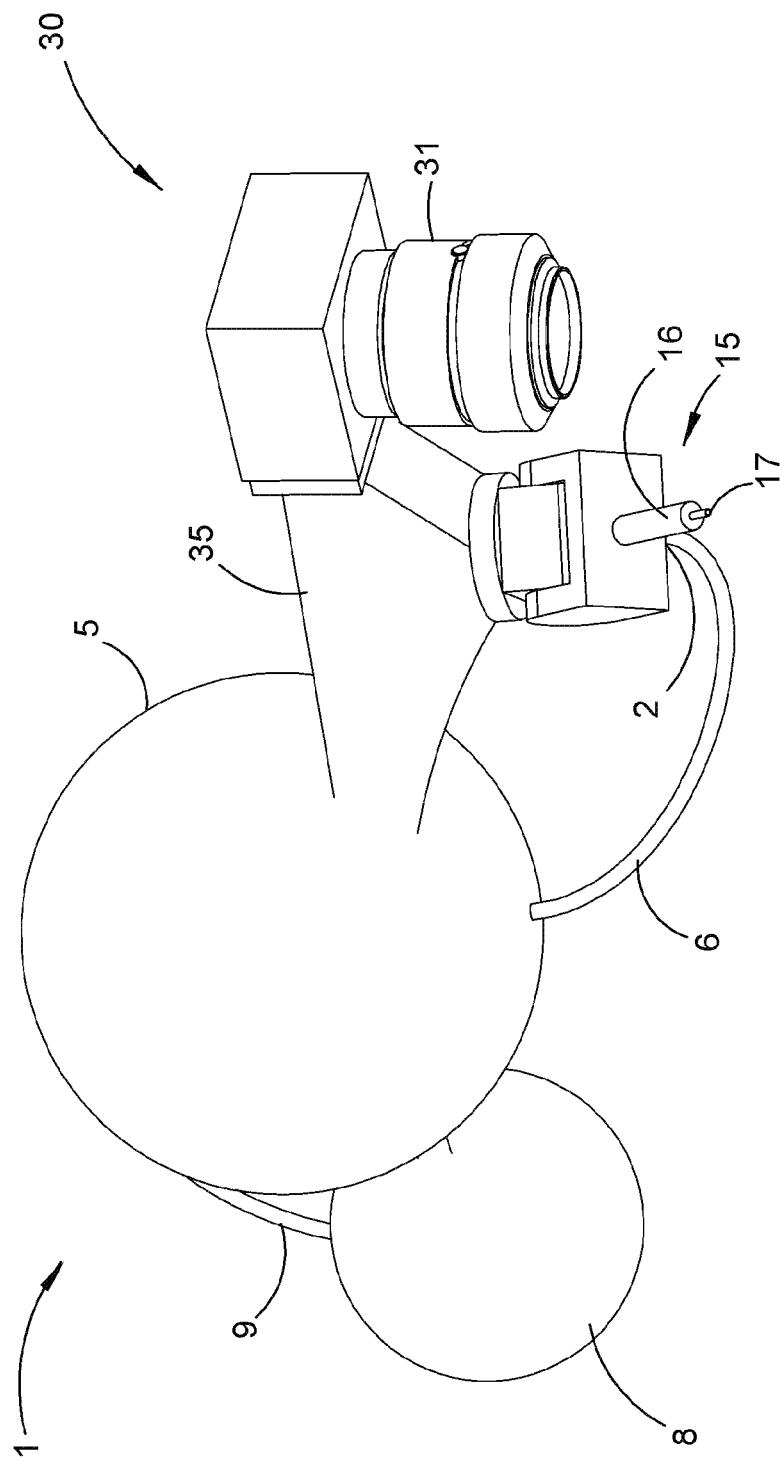
FIG. 2 is an underside perspective view of the apparatus shown in FIG. 1.

Referring initially to FIGS. 1 and 2, the invention in a first embodiment provides an apparatus (1) for projecting a fluid, preferably a liquid, toward a target. The apparatus includes a fluid inlet (2) adapted for connection to a source of pressurised fluid selected for use in connection with a specific environmental control function such as irrigation, fertilisation, pest eradication, weeding, pruning, thinning, planting or harvesting, as described in more detail below.

In this embodiment, the source of fluid is a generally spherical fluid storage reservoir (5) connected to the fluid inlet by means of a supply line (6), and also connected to an associated fluid pressurisation system (7). In this embodiment, the pressurisation system includes a spherical pressure vessel (8) adapted for periodic re-pressurisation to a predetermined operational pressure level. The pressure vessel (8) is connected for fluid communication with the reservoir (5) by means of high pressure supply line (9). In other embodiments, however, the fluid pressurisation system may include a pump, compressor, expandable bladder, or alternative mechanical or chemical pressurisation means. A pressure regulator may be included if required to facilitate accurate control over the supply pressure. A pressure relief valve may also be incorporated to prevent system pressure from exceeding predetermined maximum threshold levels.

A fluid outlet (15) includes a nozzle (16) incorporating at least one outlet orifice (17) adapted to direct the pressurised control fluid emanating from the nozzle toward a target, in the form of a liquid stream, jet or "projectile".

The apparatus further includes an activation mechanism incorporating a control valve selectively moveable between an operative mode in which the fluid outlet is effectively open, and an inoperative mode in which the fluid outlet is effectively closed. The control valve in this embodiment takes the form of a dispensing valve mechanism incorporated into the nozzle, such that the dispensing valve effectively incorporates both the nozzle and valve functions, as well as the outlet orifice. Alternatively, the control valve mechanism may be positioned within the supply line, or elsewhere as appropriate.

In some embodiments, the control valve of the activation means may only be movable between two states; open and closed, whereas in other embodiments, progressive regulation of the control valve position is possible, to provide variable control over flow rate, pressure and/or velocity. Some embodiments also permit selective control over the pressure supplied by the pressurisation system, to facilitate further control over the delivery pressure, flow rate and/or velocity of the fluid exiting the outlet orifice with the control valve in the operative mode.

The apparatus further includes a targeting mechanism incorporating a movable outlet support assembly (20) rotatable on at least two independent control axes for selectively orienting the outlet orifice (17) and thereby orienting the jet of control liquid in the operative mode. In this embodiment, the movable outlet support assembly includes a turret incorporating a first member (22) rotatable about a first axis (oriented vertically in the drawing) and a second member (23) mounted to the first member for rotation about a second axis generally normal to the first axis (oriented horizontally in the drawings) in a gimbal configuration. The nozzle (16) and associated outlet orifice (17) are fixedly connected to the second member (23) of the turret.

In this way, it will be appreciated that the movable outlet support assembly, or turret, provides freedom of movement about orthogonal pan and tilt axes, to facilitate targeting of the outlet orifice and hence the jet of control fluid emanating therefrom. The targeting mechanism further includes a pair of independently operable actuators (not shown) to effect movement of the members (22, 23) of the outlet support assembly (20) about their respective control axes, and thereby to enable controlled movement of the fluid outlet throughout its operational range.

The apparatus further includes a sensing system (30) for sensing aspects of the environment in which the apparatus is placed, and generating images or other data indicative thereof. In this embodiment, the primary sensor includes a digital camera (31) adapted to generate a two-dimensional image of the environment. In other embodiments, however, 3-D imaging techniques such as laser scanning or multi-modal sensing may be utilised for mapping and localisation. A classification system is employed for identifying targets within the environment on the basis of data received from the sensing system, as described more fully below.

A control system (35) includes memory modules, microprocessors, navigation systems incorporating GPS or alternative positioning systems, and associated control software. The control system is adapted to orient the outlet orifice toward the identified targets, by means of the targeting mechanism, and to activate the jet of control liquid via the activation means, in accordance with predetermined control logic as described more fully below, thereby to deliver jets or projectiles of the control fluid to the identified targets for the purposes of the desired environmental control function.

The control fluid is preferably a liquid and in one embodiment, the environmental control function is the growth of a selected agricultural plant or crop. In one preferred form, the control liquid is water for irrigation and/or a liquid fertiliser to enhance plant growth, in which case the targets for the system are the plants to be cultivated, or the immediately surrounding soil. In another form of this embodiment, the control liquid is a herbicide for killing weeds that would otherwise impede plant growth and in that case, the targets are weeds, or soil immediately adjacent the weeds, as distinct from plants to be cultivated.

In further variations, the pest may take the form of a fungal infection or other disease on the plant itself, in which case the control liquid may take the form of a fungicide or other suitable herbicide, pesticide or agricultural chemical formulation, targeting visual or other indications of plant infection or infestation. In a further variation, the targeted agricultural pests may be insects or other endo- or ecto-parasitic animals such as locusts, nematodes, moths, molluscs, mites, ants, beetles, centipedes, millipedes or the like and again, in such embodiments, the control of liquid may include a pesticide or nematicide adapted to selectively eradicate, or at least control, such pests. In some cases, the control liquid may include a repellent adapted to prevent or impede attack by pests that are known to be potentially problematic.

In a further variation, the pests whether plant or animal in nature may be effectively eradicated by the energy of the control liquid, as distinct from its chemical composition. For example, in some embodiments, the kinetic or thermal energy of a targeted water jet is used to eradicate or remove weeds or animal pests.

In one variation, the water jet is used to cut the stems or foliage of targeted weeds or other undesirable invasive plants, thereby to remove the weeds by a form of water jet cutting without the need for agricultural chemicals. In a further variation of this form of the invention, the energy of the jet of control liquid, typically water, may be used to physically sever the stems of target plants, as a means of systematically pruning, trimming, thinning, edging or harvesting the target plants or crops. These forms of the invention may be particularly advantageous in the context of organic farming, and herbicide-resistant weeds.

In some modes of operation, during each firing sequence, the operative mode of the activation mechanism is relatively short in duration, such that the jet emanating from the outlet orifice takes the form of a slug or "projectile" of the control liquid. Depending upon the supply pressure, the diameter of the outlet orifice, the firing duration and other relevant factors, each liquid jet or projectile may only comprise a very small volume of liquid, and this facility can be used for precise, highly targeted micro-dosing regimes.

In one variation, multiple liquid projectiles may be released in rapid succession, in a manner analogous to machine-gun fire. In another variation, multiple liquid projectiles may be released simultaneously, in a manner analogous to shot-gun fire. In other modes of operation, each firing sequence may be substantially longer in duration, such that the jet in each sequence takes the form of a semi-continuous stream of the control liquid, which continues to flow until the control valve of the activation means is closed, at the completion of that firing sequence. In each case, the supply pressure at the outlet is ideally regulated to ensure correct delivery of the control liquid along the expected trajectory, while minimising excess run-off or spatter on impact. Precise dosage and velocity parameters may be regulated using pulse-width modulation (PWM), pulse-duration modulation (PDM) or other suitable control strategies.

The outlet and related fluid dynamics are also designed such that the liquid projectile hits the target substantially intact as a coherent stream, body or slug of liquid, rather than as a dispersed mist or scattered spray of droplets. While some degree of separation or breakup of the liquid projectile may inevitably occur, it is ideally kept to a minimum. An additive may be used to maintain coherency of the fluid stream or to minimise unwanted splatter following impact with a target. This in turn minimises the rate of consumption of the control liquid, while also minimising damage to surrounding plants if weeds are targeted with concentrated herbicides, pesticides or other chemicals that may be harmful if inadvertently contacting nearby plants. Further, it is envisaged that the fluid or projectile will be travelling at a relatively high velocity such that it penetrates the target (e.g. to the sap layers) which may have benefits in both effectiveness of controlling the target, as well as avoiding unwanted overspray or splatter.

Nevertheless, there may be particular applications in which it is preferable to disperse the control liquid jet into a spray or mist, for example for effective coverage of a large target, in which case the nozzle and/or outlet orifice may be configured accordingly. This optional spray dispersion functionality may be selectively operable, either manually for particular purposes, or automatically when required as part of an overall sensing, classification and control strategy. Similarly, there may also be particular applications in which it is preferable to dispense the control at a relatively low velocity where, for example, the target is sensitive, such as a flower to be pollinated using a liquid and pollen suspension projectile.

In one embodiment, the fluid outlet orifice (17) is generally circular in cross-sectional profile. In other embodiments, however, a variety of alternative shapes and configurations may be utilised. For example, in one embodiment, the orifice is generally rectangular in cross-sectional profile, such that the jet of control liquid conforms to a corresponding elongate profile, in the form of a liquid sheet or wall, or a correspondingly shaped projectile. This configuration may be advantageous, for example, in embodiments targeting and severing the stems of plants, whether for removal of unwanted weeds or harvesting of desired plants or crops. In another embodiment, the profile of the stream can be achieved synthetically by the motion of a fine point outlet orifice.

In a further embodiment, a plurality of outlet orifices is incorporated into the fluid outlet. These orifices may be arranged so as collectively in use to form a combined sheet or wall of control liquid, for purposes similar to those described above, in situations where it is more efficient or effective to project a composite jet with a relatively large overall cross-sectional profile. For example, in irrigation, fertilisation or "fertigation" applications, it may be preferable to deliver a plurality of liquid jets of relatively low energy simultaneously, as compared with a single jet of substantially higher energy, so as to avoid damage to the foliage, fruit, blossoms, stems or root systems of the target plants. In variations of this embodiment, different orifices may be adapted to deliver different control liquids. For example, one orifice may be adapted to deliver a first liquid such as water for irrigation while a second orifice may be adapted simultaneously or sequentially to deliver a second liquid such as fertiliser or pesticide, optionally drawn from a separate tank or reservoir.

In some such embodiments, the targets for the respective orifices may also be different. For example, in one form, the first orifice is used to target plants or surrounding soil with irrigation liquid or fertiliser to enhance growth, while the second orifice in the same nozzle is used to target weeds or other pests with herbicides, pesticides and/or high energy jet streams, for the purpose of reduction or eradication. In another variation, the multiple orifices may be targeted and activated simultaneously, to deliver increased dosage levels of the same control liquid, or simultaneous dosages of complementary liquids, to the same location, as and when needed. For example, in some applications relatively low doses of a particular agricultural chemical formulation, such as a nitrogen-rich fertiliser, may be used to enhance plant growth, while relatively high doses of the same chemical may be selectively used to kill weeds. In a further variation, the multiple orifices may be adapted to be targeted, oriented and activated independently of one another, utilising independent nozzles and targeting mechanisms.

Figure 3:
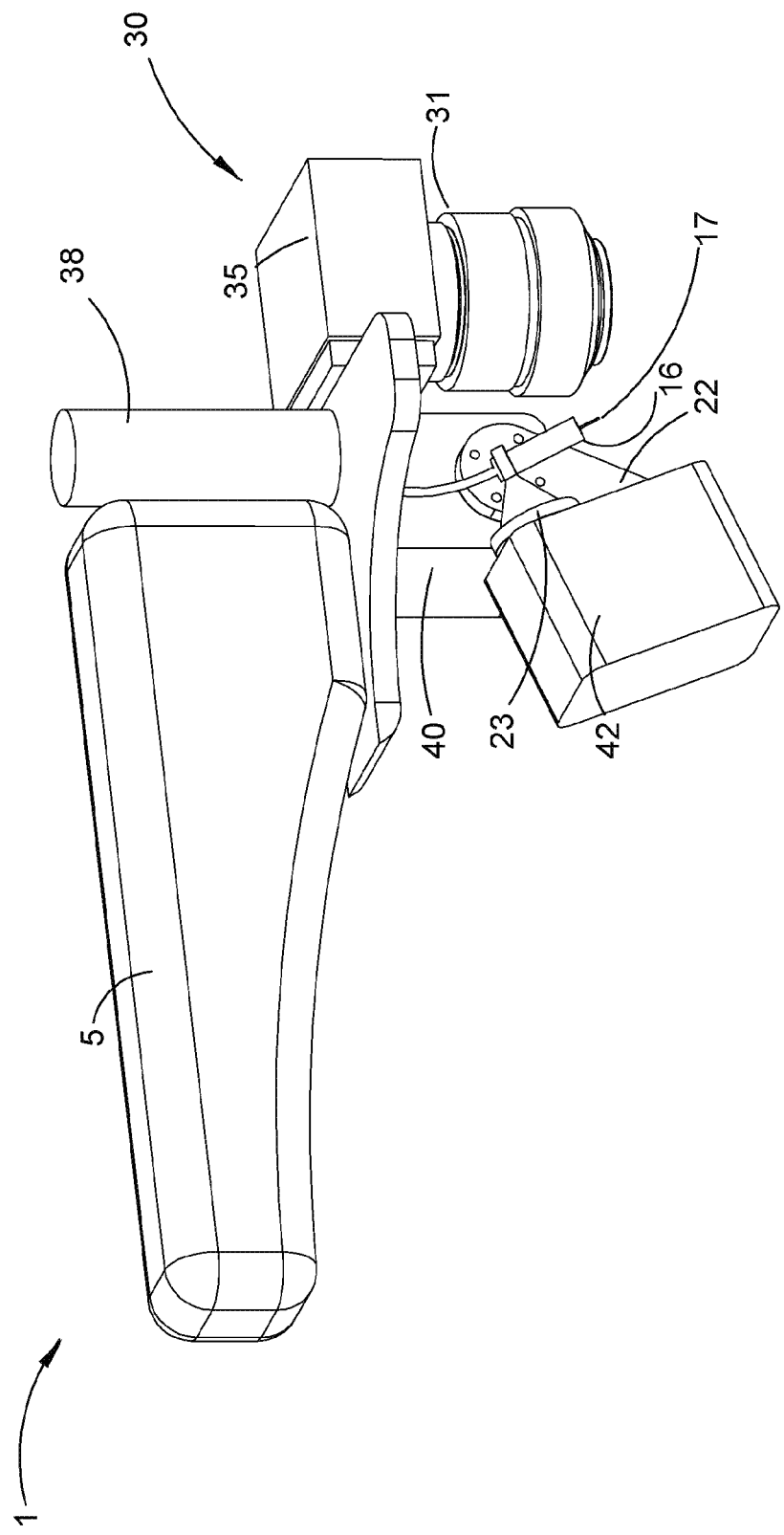
FIG. 3 is a perspective view of an automated target recognition and fluid projectile dispensing apparatus according to a second embodiment of the invention.
Figure 4:
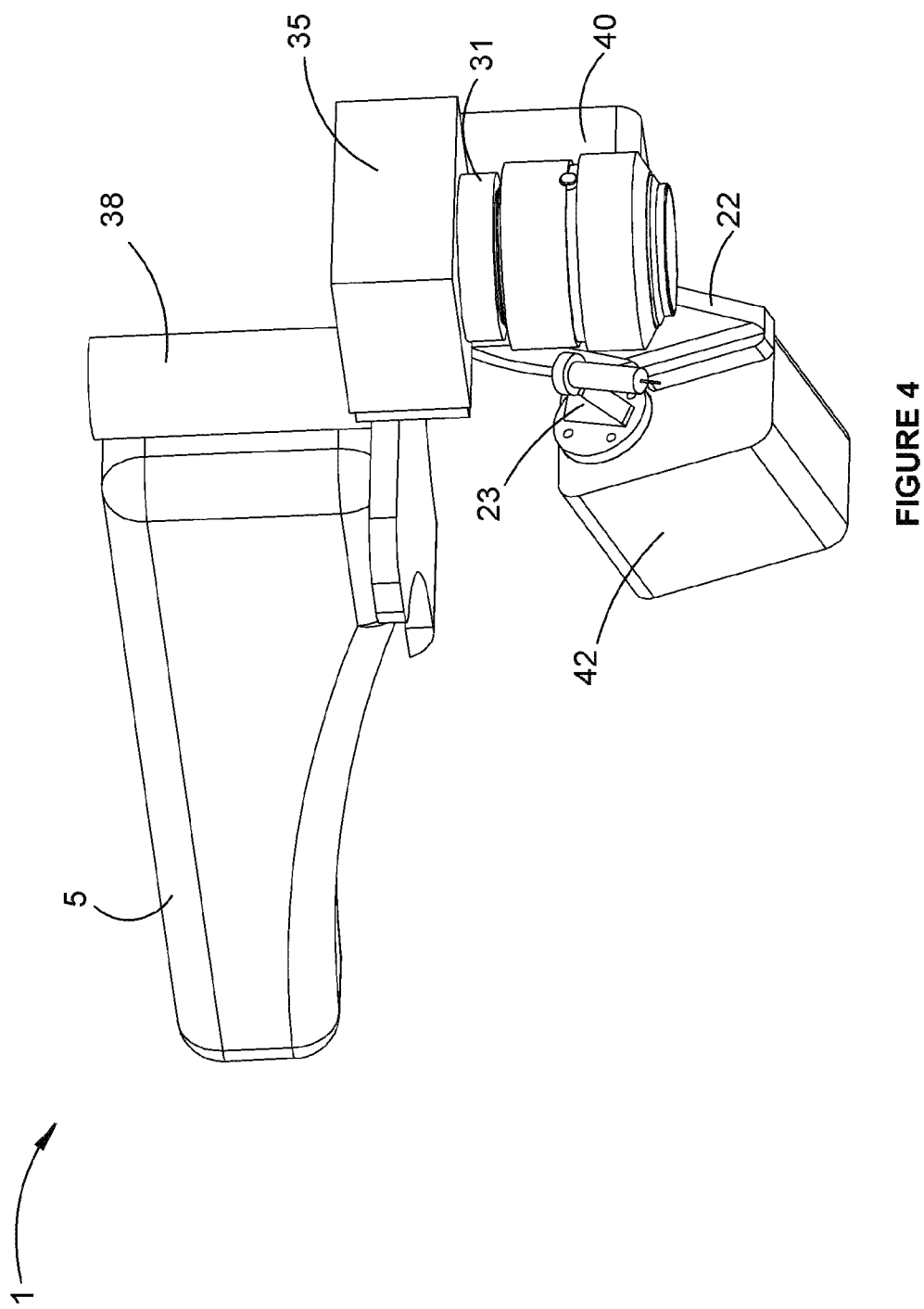
FIG. 4 is an underside perspective view of the apparatus shown in FIG. 3.

FIGS. 3 and 4 show a second embodiment of the invention, in which corresponding features are denoted by like reference numerals. In this case, an external pump assembly (38) is used to generate the supply pressure for the control liquid and in variations of this embodiment, the liquid storage reservoir (5) incorporates an internal pump assembly to generate the supply pressure. A first servomotor (40) is used to effect rotation of the first member (22) of the outlet support assembly about the first axis, while a second servomotor (42) is used to effect rotation of the second member (23) of the outlet support assembly about the second axis. The dispensing valve is positioned at, or closely adjacent, the point of intersection of the rotational control axes, which minimises the swept volume of the end-effector and reduces the transformation calculations required by the control system. This configuration of servomotors also enables the liquid dispensing valve to be positioned closely adjacent to, or in co-location with, the sensing system, which in some applications is advantageous for reasons outlined more fully below. In other respects, the operation of this embodiment is similar to that previously described. It will be appreciated that, in other embodiments requiring higher degrees of control resolution, instead of employing the first and second servomotors, the outlet assembly may be positioned or orientated through the use of rotary or linear solenoid actuators (i.e. to provide the desired pan and tilt orientation to direct the jet of control fluid to the desired target). The solenoid actuators may optionally be used in conjunction with dedicated rotary or linear encoders or the like, as part of a closed loop feedback system.

Figure 5:
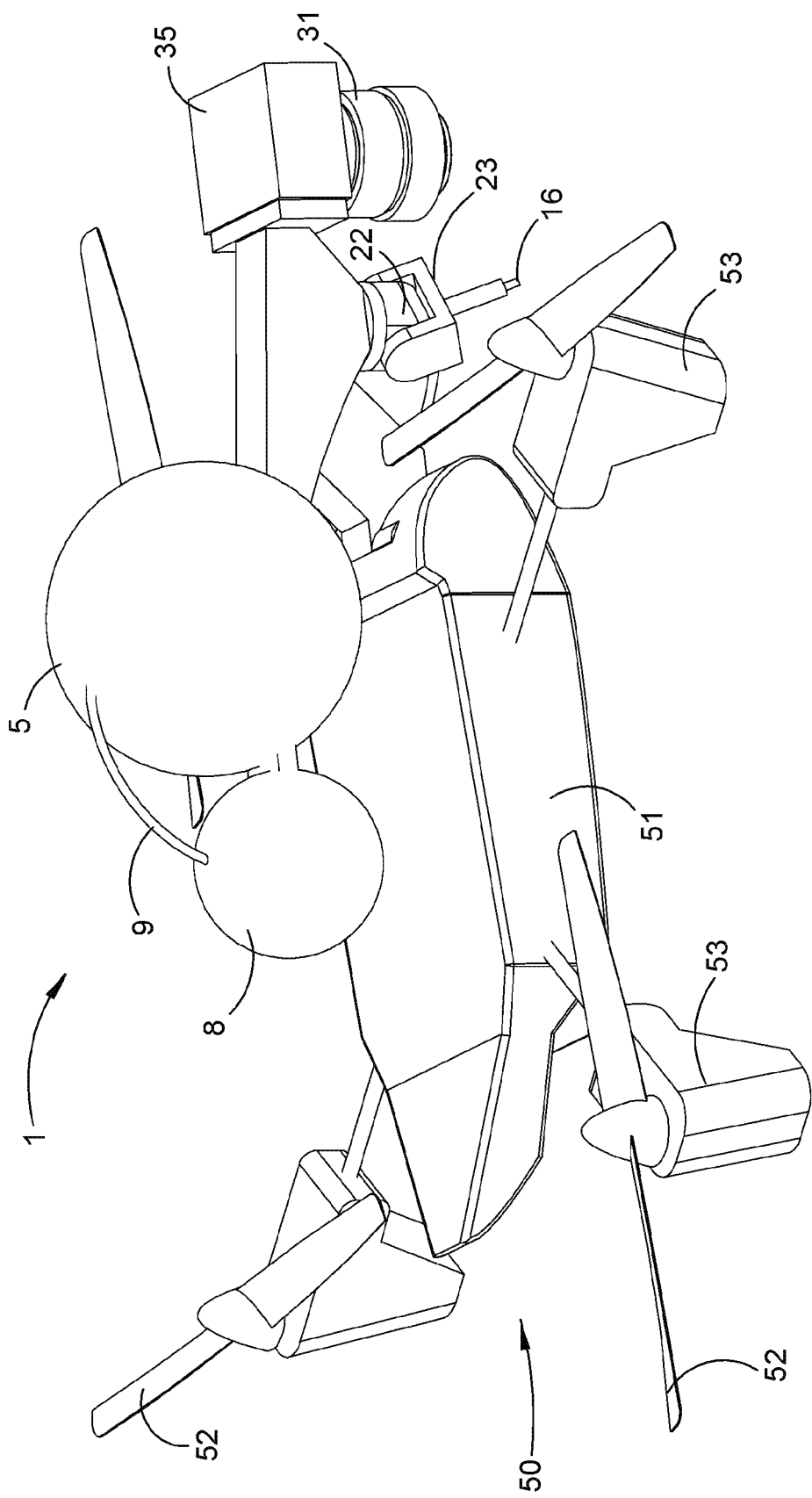
FIG. 5 is a perspective view of the apparatus of FIGS. 1 and 2, mounted to a UAV according to a further embodiment of the invention.
Figure 6:
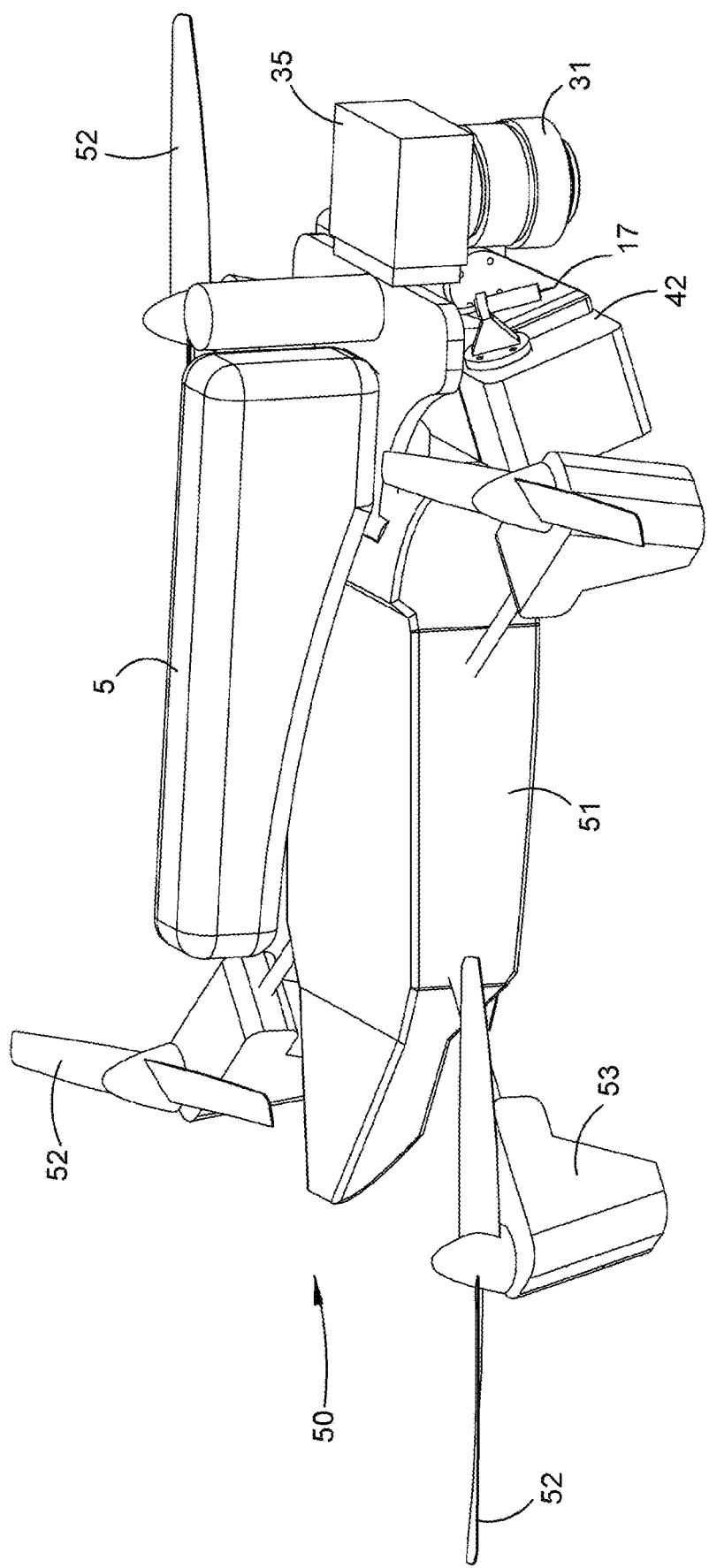
FIG. 6 is a perspective view of the apparatus of FIGS. 3 and 4, mounted to a UAV according to a further embodiment of the invention.

FIGS. 5 and 6 show a further embodiment of the invention, in which the apparatus of FIGS. 1 and 2 is attached to and integrated with an unmanned aerial vehicle (UAV), the control of which is automated as part of an overall environmental scanning, targeting and route planning control methodology, optionally networked and operating systematically in conjunction with a number of like or complementary autonomous vehicles.

The UAV (50) incorporates a body (51), four independent rotors (52), drive motors (53) and auxiliary equipment including an onboard power supply, remote communications module, navigational control system including GPS and related hardware and software components, which will be generally familiar to those skilled in the art. FIG. 6 shows an embodiment similar to FIG. 5, but with the apparatus of FIGS. 3 and 4 mounted to the UAV. It will be appreciated that in other embodiments, any number of rotors may be employed on the UAV, for example from one to eight or more, and in further variations fixed wing aircraft, or even hovercraft, may be used. Other forms of propulsion may additionally or alternatively be utilised, including turbofans, jets or the like.

Figure 7:
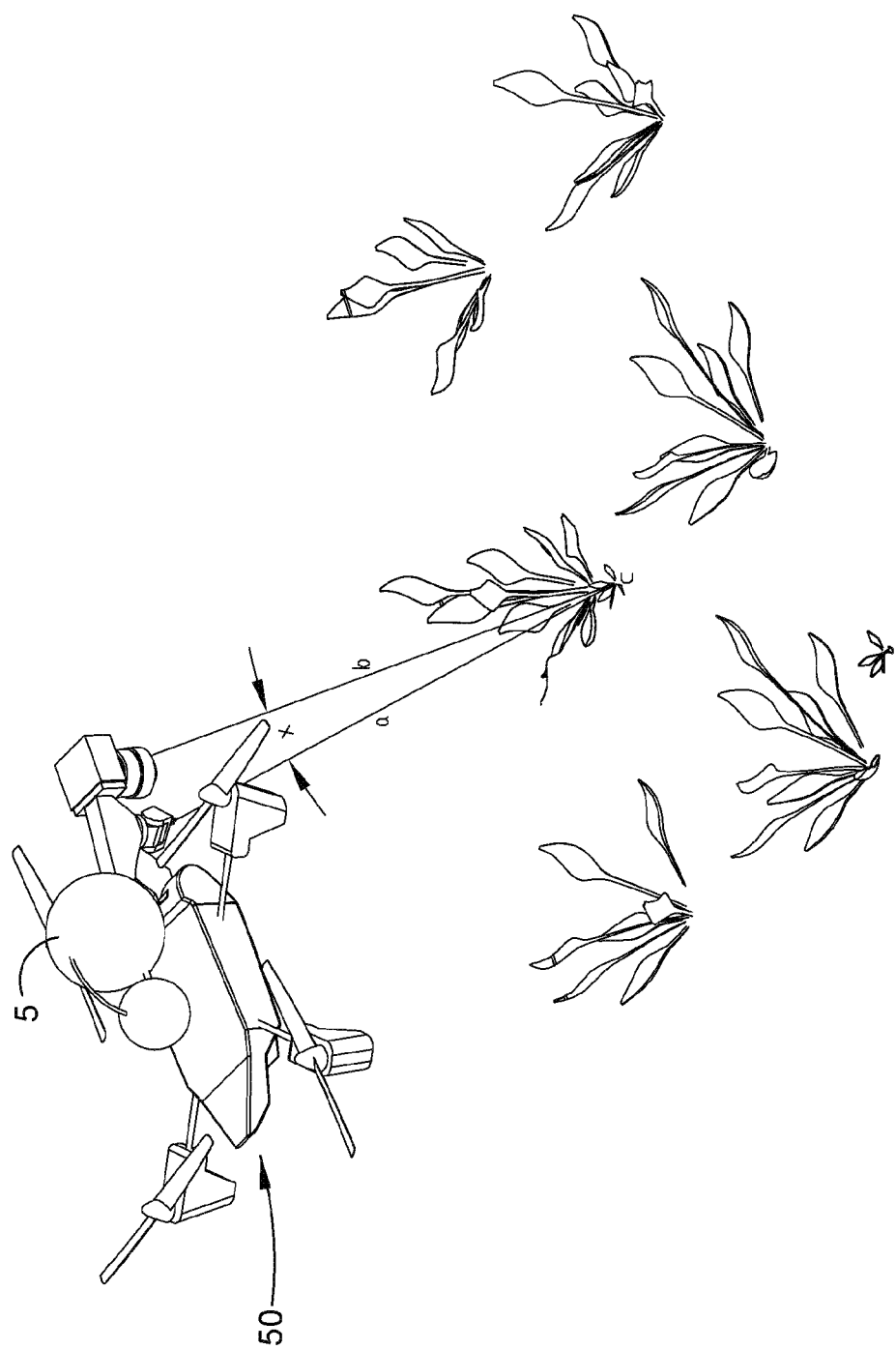
FIG. 7 is a perspective view of the UAV-based apparatus of FIG. 5, travelling above a bed of planted crops, targeting weeds for eradication.

FIG. 7 shows the UAV of FIG. 5 in a targeting mode. In this figure, the liquid projectile trajectory is represented by ray "a" and a direct line of sight projected from the sensor, in the form of camera 31, is represented by ray "b". The angle subtended by rays "a" and "b" is designated angle "x" and represents the potential for parallax error. In some embodiments, where angle "x" is determined to be potentially significant (which to some extent will be application-specific), the parallax error is calculated in conjunction with a ranging sensor and other relevant parameters, and compensated for in the targeting algorithms of the control system.

In some preferred embodiments, however, the primary sensor is substantially co-located with the fluid outlet such that the ray "b" projected from the sensor is substantially co-linear with the liquid projectile trajectory "a". Advantageously, this configuration can substantially simplify the methodology for 3-D terrain mapping and obstacle avoidance, because as a result of the co-location as described, if the target can be detected by the sensor on the basis of a direct line of sight, then it is known that the target can be hit directly by the liquid jet or projectile, subject only to range constraints, without the need for more complex terrain mapping, route planning or obstacle avoidance routines. In other words, the control strategy can be substantially simplified because the fluid outlet can always be "aimed" at whatever the sensor is "seeing".

In more sophisticated embodiments, particularly if longer ranges with significant horizontal components are envisaged, the control system may also incorporate parabolic ballistic trajectory algorithms to account for gravitational influence on the liquid jet or projectile. Similarly, other factors such as air resistance, windage, relative velocities and the like may be compensated for by means of appropriate sensors and associated control algorithms, if required in particular applications.

Figure 8:
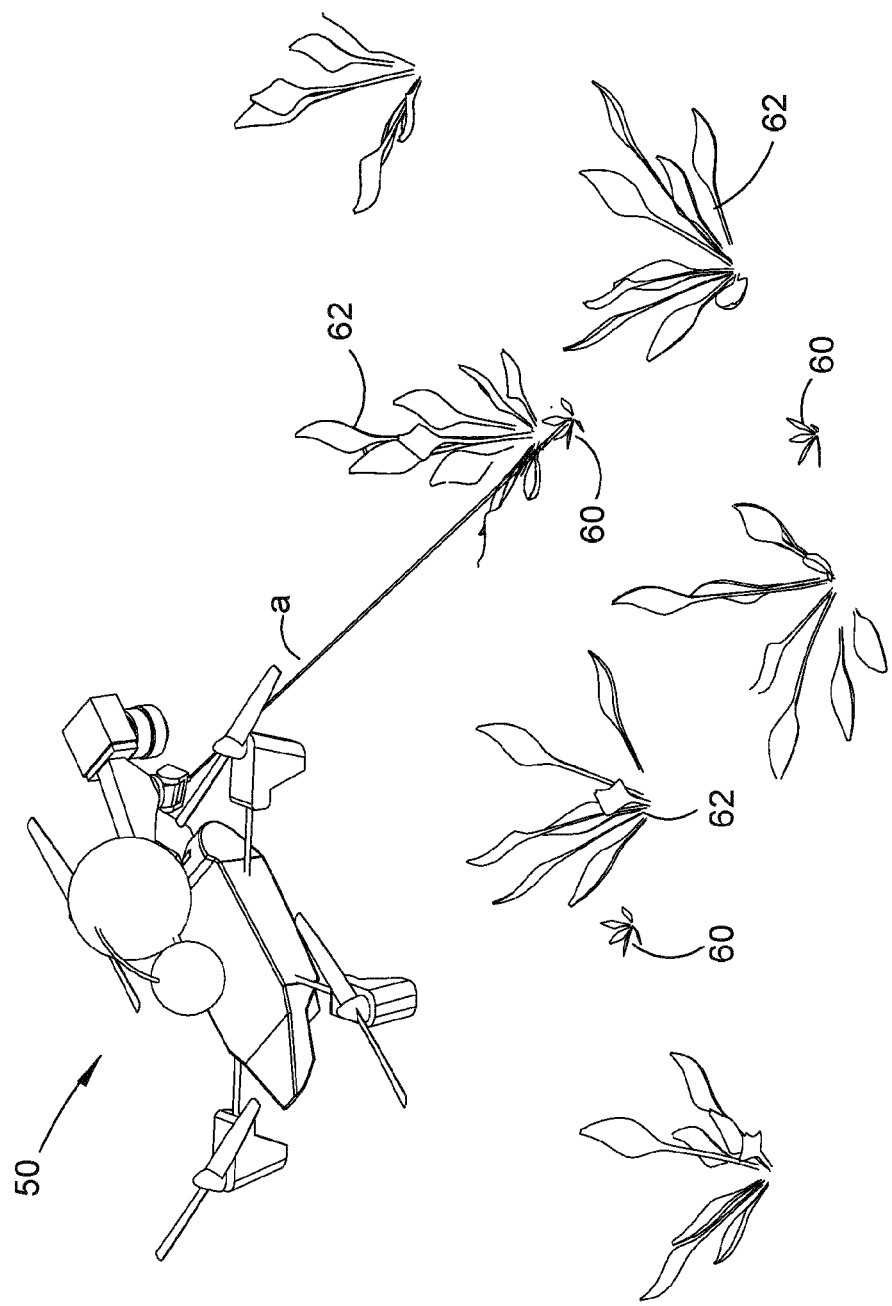
FIG. 8 shows a perspective view of the apparatus of FIG. 7, firing jet or projectiles of liquid pesticide at the targeted weeds.
Figure 9:
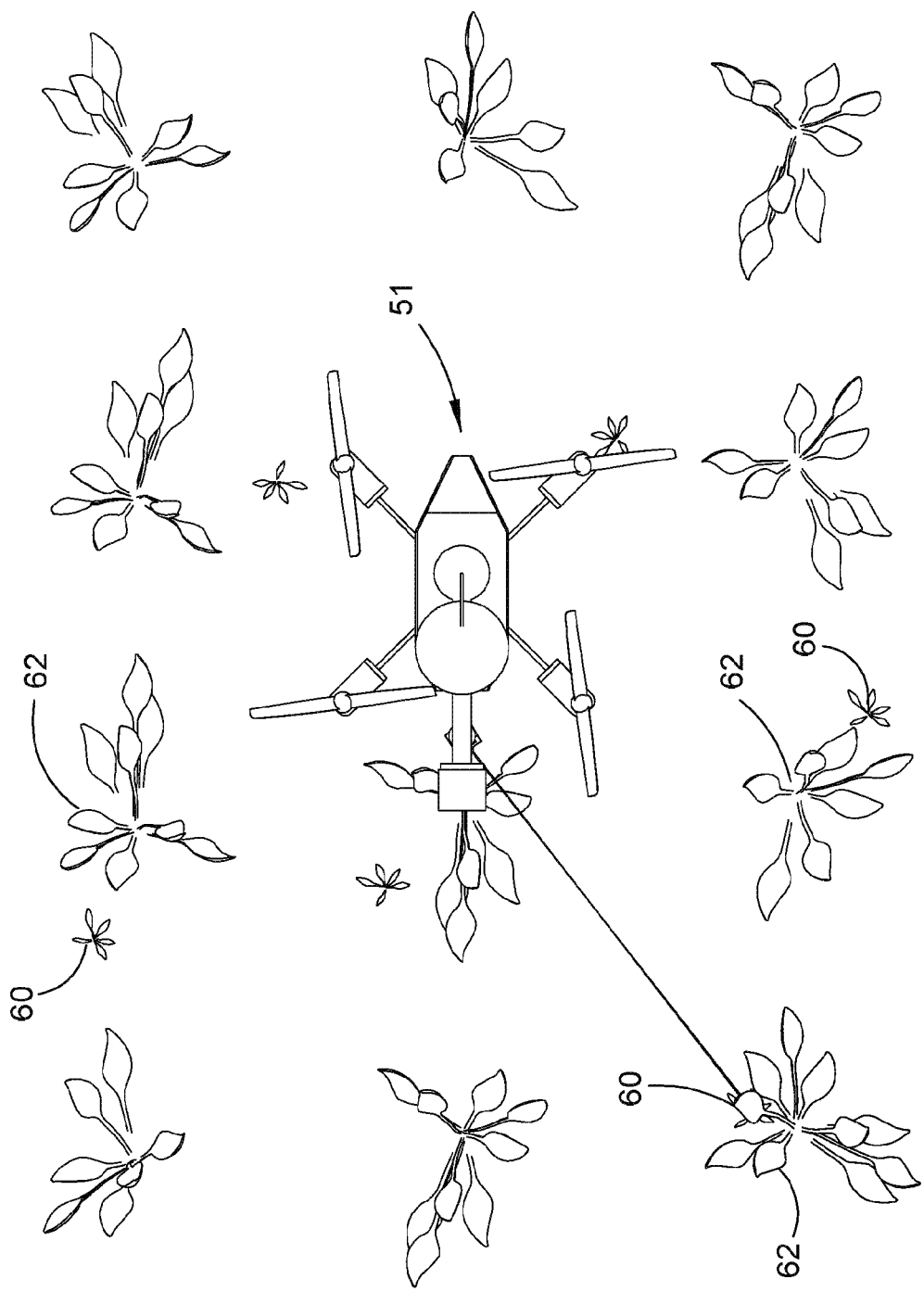
FIG. 9 is a plan view of the UAV apparatus of FIG. 8, in operation.

FIGS. 8 and 9 show the UAV of FIG. 7 in a firing mode whereby having identified a target, in this case a weed (60) to be eradicated with a suitable liquid herbicide, and established a direct line of sight to the target, a pre-programmed firing sequence is initiated by the control system. This directs a discrete liquid projectile, or a more prolonged jet of the control liquid, directly at the target weed. The weed is thereby targeted and effectively eradicated without the substantial degree of wastage as would occur with a dispersed spray of herbicide, and with minimal risk of inadvertently hitting and damaging nearby plants or crops (62) under cultivation. It will be noted particularly from FIG. 9 that the targeted weed (60) is occluded from above by the plant (62). The system of the present invention is readily able to deal with this situation, because of the ability to precisely control the both the angle of approach and the direction of the liquid jet or projectile, to avoid obstacles. By contrast, prior art systems with delivery mechanisms based on dispersion, or with no directional control over the liquid stream, cannot readily resolve this type of targeting problem.

In this embodiment, the primary sensor comprises a camera (31) adapted to generate a 2-D image of the environment, and the control system includes a mathematical transformation algorithm or map or correlate the pixel space of the image from the camera (or other sensors) to the positions of the actuators in the targeting mechanism, as described in more detail below. Such transformation maps may be based on look-up tables, translation/scale/mapping equations, camera calibration data or the like, in order to determine actuator positions from raw image data, or local or global coordinates. More sophisticated embodiments utilise 3-D imaging and multi-modal sensing for mapping and localisation. Such imaging and sensing technologies may include one or more of GPS, RTK, DGPS, IMU, laser ranging (point, scanning etc), hyperspectral sensing, visual, infrared or ultraviolet cameras and the like. The sensing systems may also be enhanced using supplementary lighting systems on the apparatus, including for example LED, xenon, UV or IR light sources, operating in continuous, intermittent or strobed modes.

Figure 10:
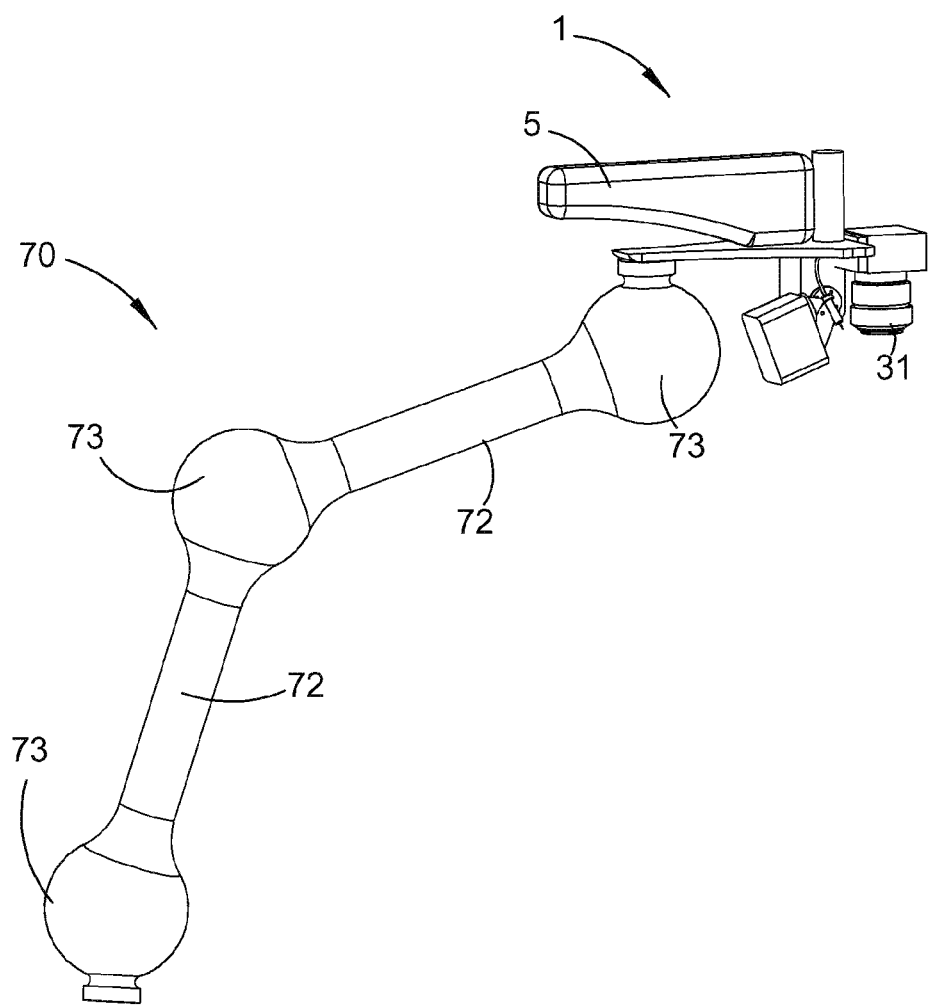
FIG. 10 is a perspective view showing the apparatus of FIGS. 3 and 4 mounted as the remote end-effector of a multi-DoF robotic arm, according to a further embodiment of the invention.

FIG. 10 shows a further embodiment of the invention, in which the apparatus of FIGS. 3 and 4 is mounted to a multi-DoF robotic arm (70), including a series of linkage elements (72) connected respectively by revolute joints (73), with the revolute joints housing respective rotary actuators responsive to the control system. The additional degrees of freedom provided by the robotic arm (70) provide a greater degree of articulation throughout a wider operational envelope.

These additional degrees of freedom and extended operational range of movement may be particularly advantageous in embodiments adapted for trimming or harvesting plants, for example, by allowing the stems to be cut by the water jet mechanism from below the plant foliage, thereby avoiding inadvertent damage to the desired plant fruit or foliage. Similarly, such embodiments may be advantageous for targeting weeds closely adjacent or even concealed beneath leafy foliage of nearby plants, where there would otherwise be risk of the weeds being inaccessible or the plants being inadvertently hit. Such embodiments may also be adapted for harvesting plants such as asparagus, where the upwardly protruding plant needs to be cut as close to the ground as possible. In applications such as this where the targeting angle, as well as the target location, is important, appropriate input parameters and constraints are incorporated into the control system.

Figure 11:
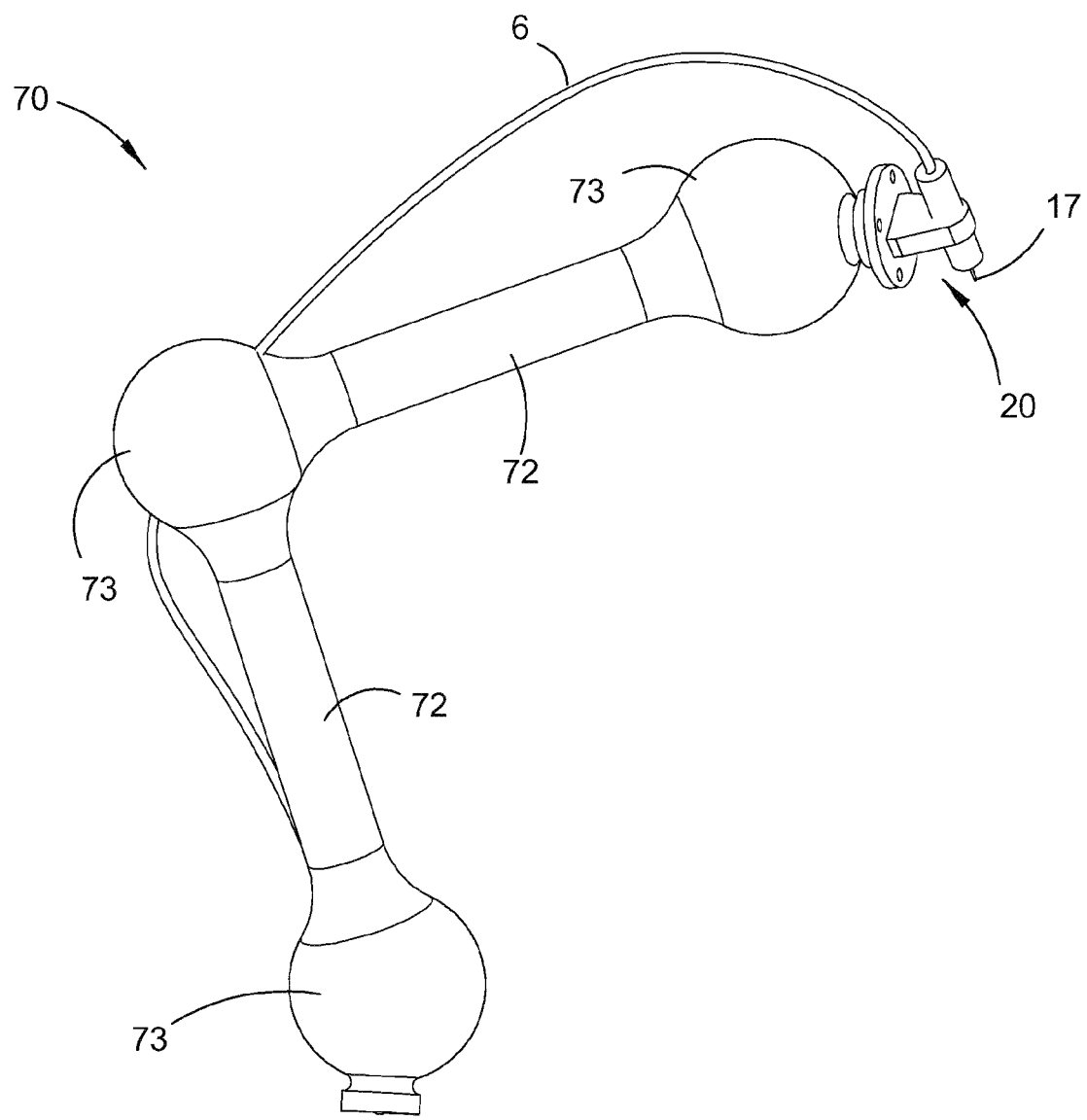
FIG. 11 is a perspective view showing a variation of the embodiment of FIG. 10, with an alternative form of fluid outlet support assembly incorporated into the multi-DoF robotic arm.

A variation of this embodiment is shown in FIG. 11, wherein similar features are denoted by corresponding reference numerals. In this case, it will be appreciated that the outlet support assembly (20) is effectively integral with, or mounted as an end-effector of, the robotic arm itself, with the rotational axes for the targeting mechanism being provided by the revolute joints and associated actuators of the robotic arm.

It will be appreciated that in both of these embodiments, additional linkages and revolute joints may be provided, for additional degrees of freedom and operational range, if required. Similarly, one or more of the linkages may be telescopically extensible to provide further degrees of freedom of movement and further extension of the operational envelope for the end-effector incorporating the liquid outlet. One example use case for a telescopically extensible linkage would be to "probe" a plant, where the target to be sprayed is the root system of the plant, which can be nestled deep within a shell of foliage, and therefore requires the entire automatic system to be inserted within the plant in order to gain a sufficient sensing and control field of view. It will be appreciated that in this example, the system is intended to be sufficiently small so as to enter or exit the plant easily during the operation, and may include one or more movable (e.g. through actuation) or static coverings in order to protect the system during the insertion or removal phase.

This multi-DoF robotic arm embodiment may be attached to or integrated with any suitable supporting structure including a fixed base, a mobile platform or an autonomous vehicle, including a UAV of the type previously described.

Figure 12:
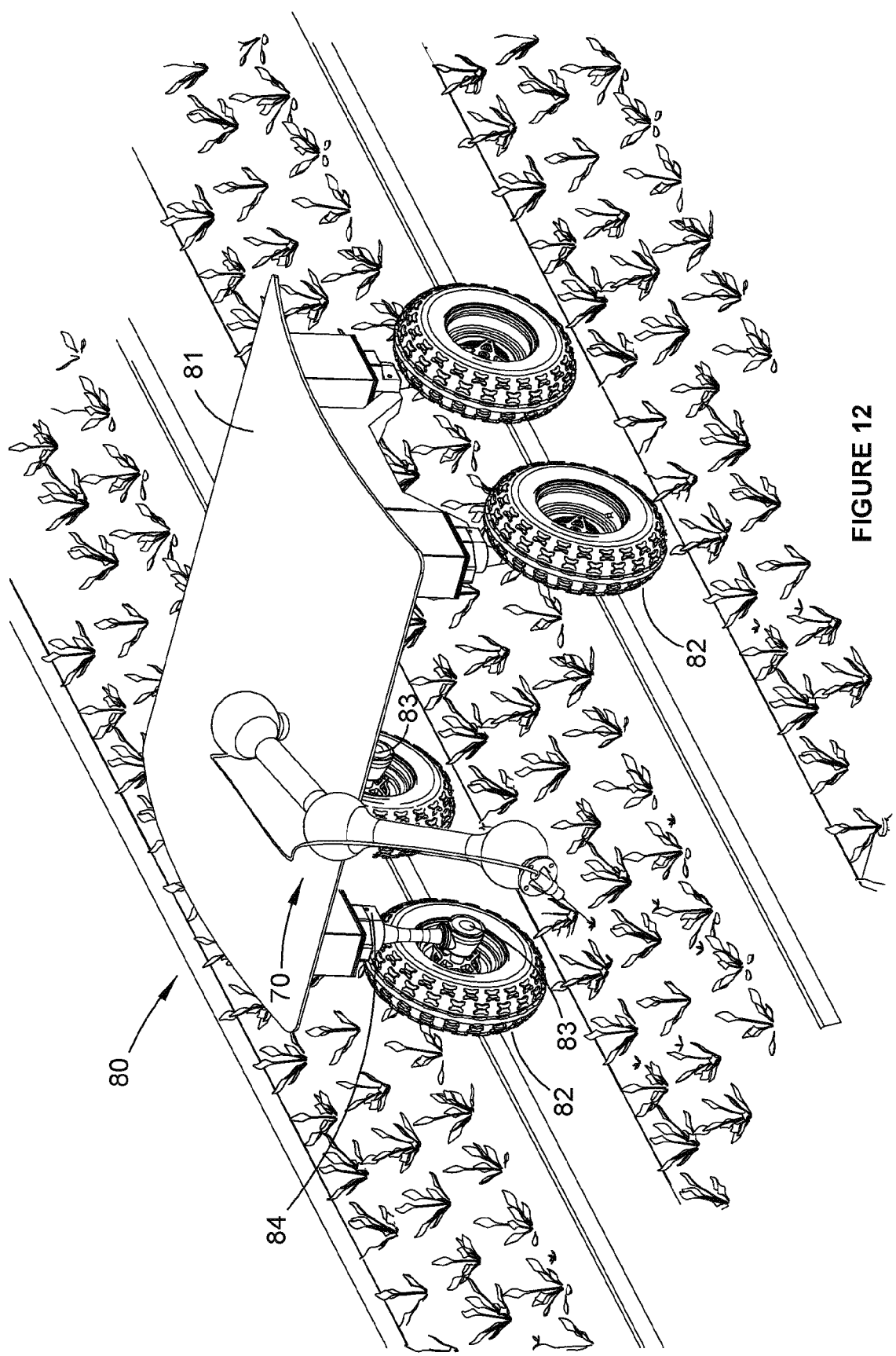
FIG. 12 is a perspective view showing a further embodiment of the invention, in which the apparatus and robotic arm assembly of FIG. 10 is mounted to a self-propelled self-guided ground-based vehicle.

In this regard, FIG. 12 shows a further embodiment of the invention, in which the apparatus (70) of FIGS. 10 and 11 is mounted to a 4-wheeled ground-based vehicle (80) incorporating a chassis and integral support platform (81). In this embodiment, the four wheels (82) are independently powered by motors (83) integrated into the wheel hubs, and independently steerable by motors (84) integrated into the wheel hub supports, to provide a high degree of maneuverability around planting rows, garden beds and the like. Numerous other positions and configurations for the drive and steering motors may obviously also be used.

The control of this wheeled vehicle (80) may be partially or fully automated, as part of an overall environmental scanning, route planning and targeting control methodology and again optionally networked in conjunction with a plurality of like or complementary autonomous vehicles.

It should be understood that a wide variety of other ground-based vehicles are also envisaged, with different numbers of wheels, tracks, legs or skids, including rail-mounted carriages, and a range of options for motive power, steering, navigation and the like. In one embodiment, a multi-legged autonomous walking vehicle or robot is used. Moreover, with weight being less of a limiting factor with ground-based vehicles, multiple fluid projecting apparatus may be mounted to a single platform for substantially simultaneous, co-ordinated operation. Larger liquid tanks or multiple tanks may be incorporated if required. It should also be understood that various embodiments of the system may be readily retrofitted to existing agricultural equipment or vehicles, including tractors, golf carts, lawnmowers, trailers, ploughs, harvesters, quads or the like. In the example of a lawn mower or golf cart, the efficiency of applications in weeding large areas of grassland can be advantageously improved as the system enables a human operator to control/drive the vehicle, whilst the targeting system operates independently for the specific control function. Advantageously, the targeting system can operate as an auxiliary operation to a primary function operation (e.g. mowing lawns). Nevertheless, there may still be a higher level control loop taking place in such an example; for instance, a lawnmower attachment that is targeting weeds may be capable of determining missed targets and indicating to the operator that they are moving too fast through a visual display or audio cue, thereby enabling suitable adjustments to be made.

Figure 18:
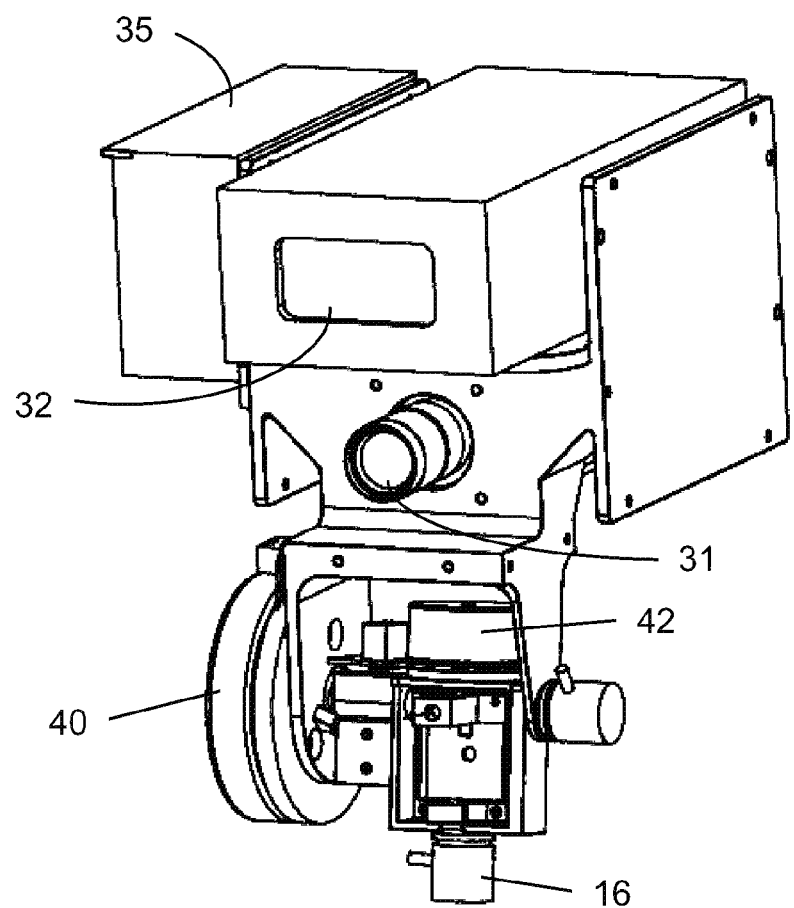
FIG. 18 is a perspective view of an automated target recognition and fluid projectile dispensing apparatus according to a further embodiment of the invention, with an imaging camera and strobe light.

FIG. 18 shows a further embodiment of the invention, in which the sensing system (30) of the apparatus includes an imaging camera (31) and a strobe light (32). Movement of the nozzle (16) is controlled about two axes by independent servomotors (40, 42). A control unit or module (35) is mounted on the side of the apparatus and houses the controller and related devices for controlling operation of the various components of the apparatus.

Figure 19:
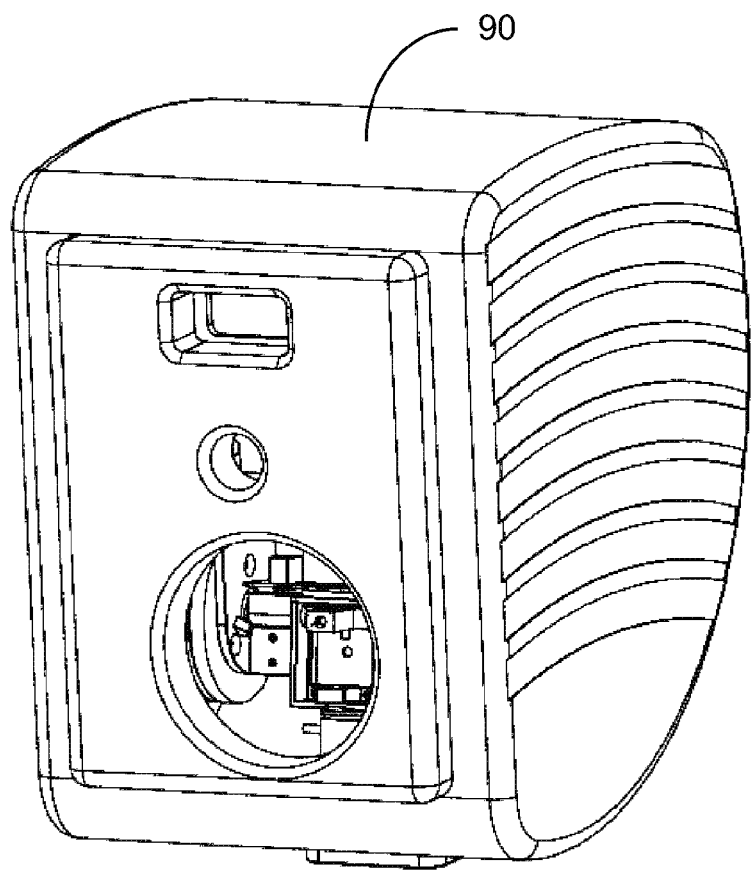
FIG. 19 is a perspective view of the apparatus of FIG. 18, mounted within a protective enclosure according to a further embodiment of the invention.
Figure 21:
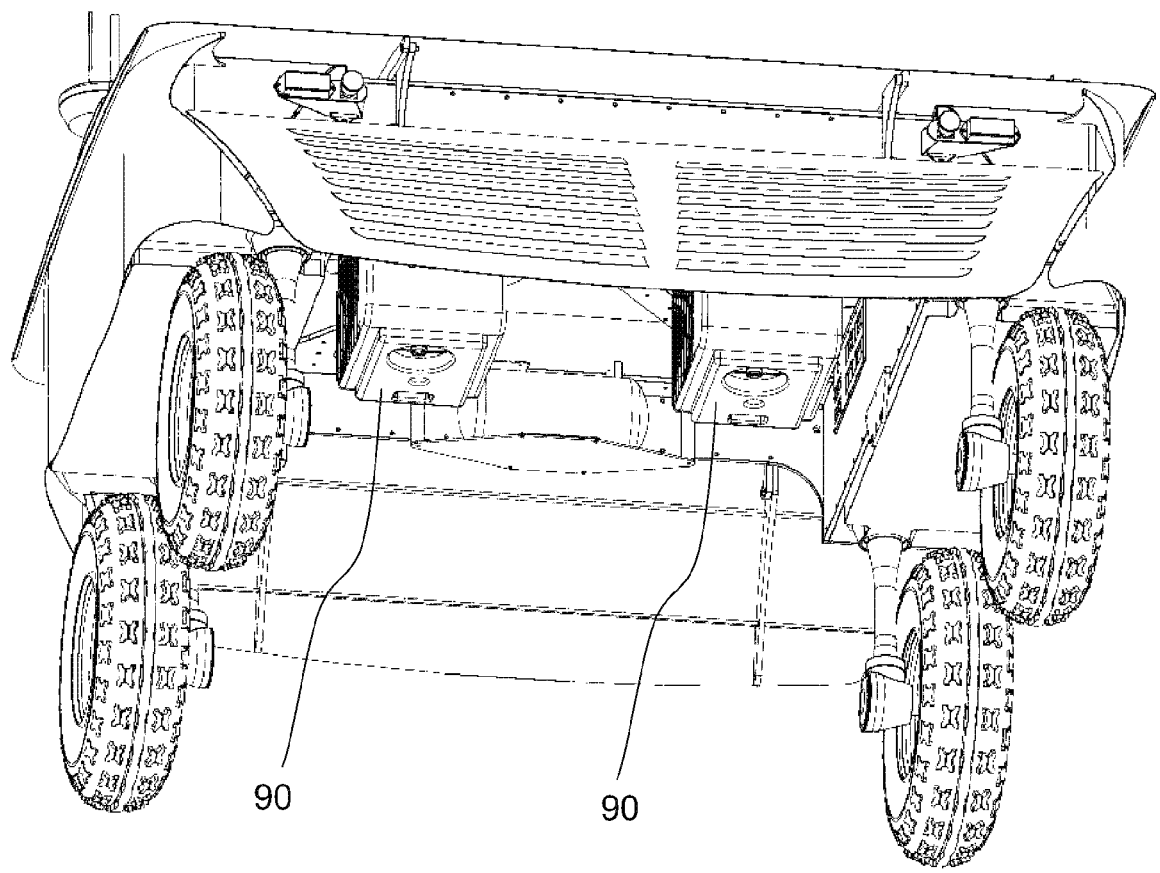
FIG. 21 is a perspective view showing a further embodiment of the invention, in which two of the apparatus of FIG. 19 are mounted to an underside of a ground-based vehicle.

In FIG. 19, the apparatus of FIG. 18 is housed within a protective enclosure in the form of a box-like cabinet or cover (90). FIG. 21 shows a further embodiment of the invention, in which two of the enclosed apparatus of FIG. 19 are mounted to an underside of 4-wheeled ground-based vehicle (80).

Figure 20:
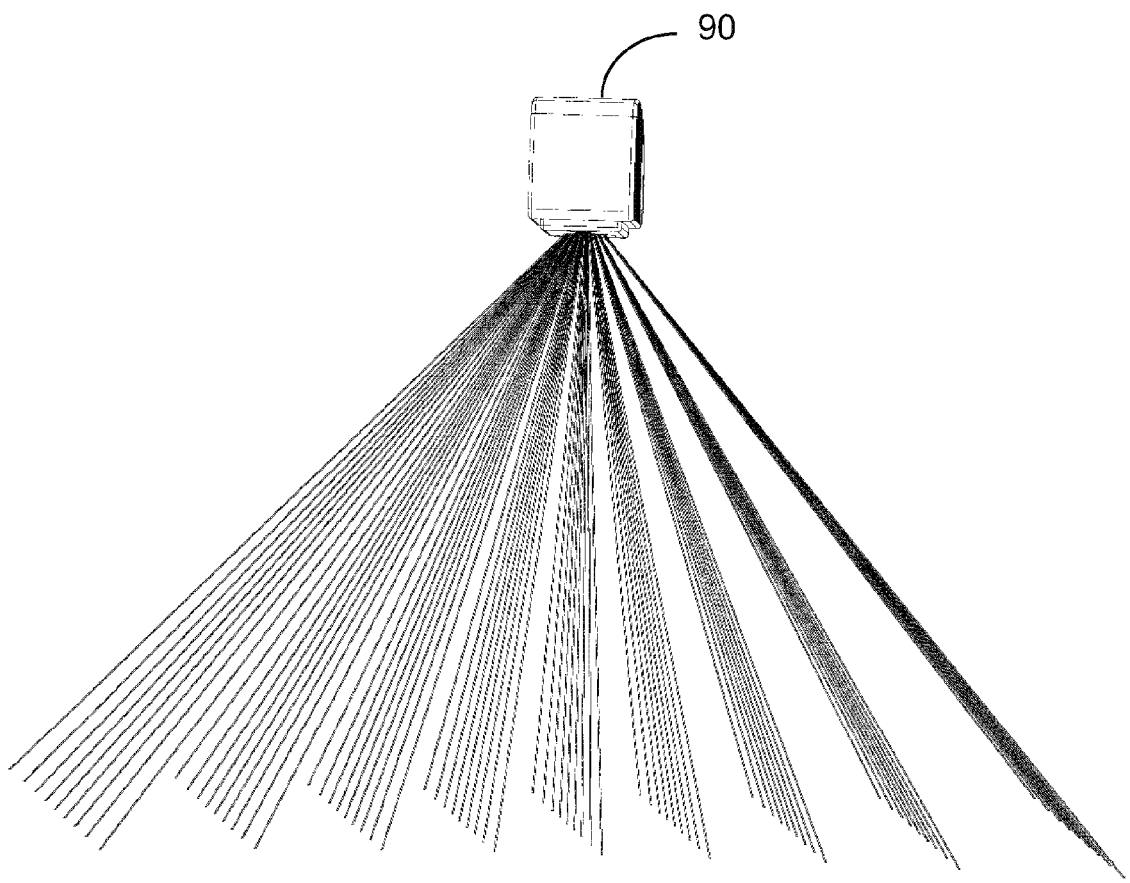
FIG. 20 is a schematic view of the apparatus of FIG. 19, graphically showing the range of the sensing system according to an embodiment of the invention.
Figure 22:
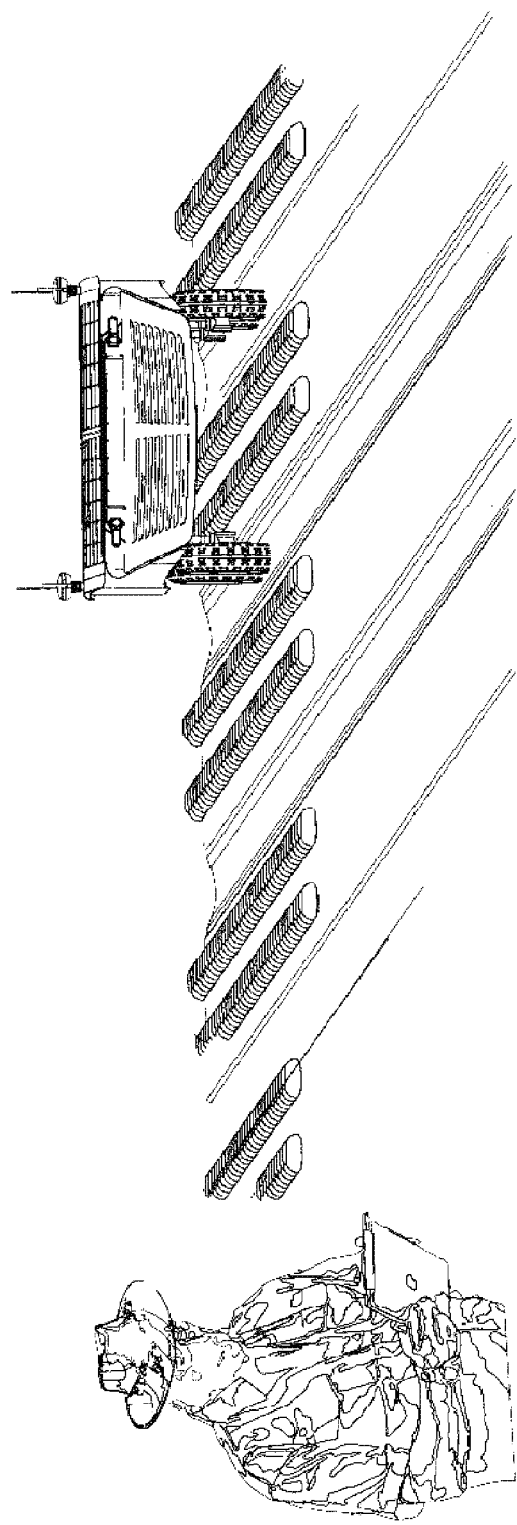
FIG. 22 is a schematic view of a ground-based vehicle on which an embodiment of the an automated target recognition and fluid projectile dispensing apparatus is mounted, with an operator remotely and wirelessly communicating with the apparatus over a network via an electronic tablet device.
Figure 23:
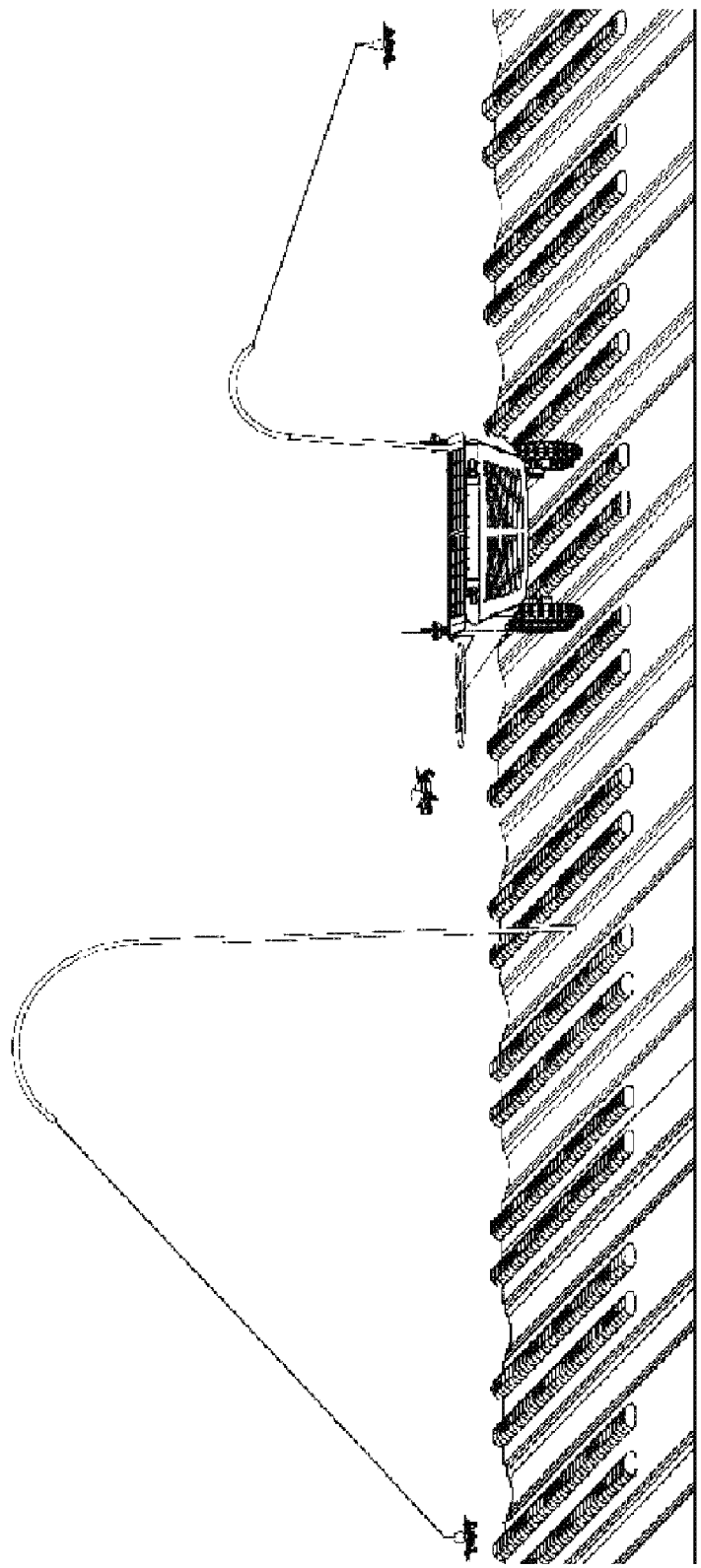
FIG. 23 is a schematic view showing a first automated target recognition and fluid projectile dispensing apparatus tethered to fixed pole in the ground, a second apparatus tethered to a pole on a ground-based vehicle, and a third apparatus mounted on a UAV and adapted to launch and land from a landing pad on the UAV.
Figure 24:
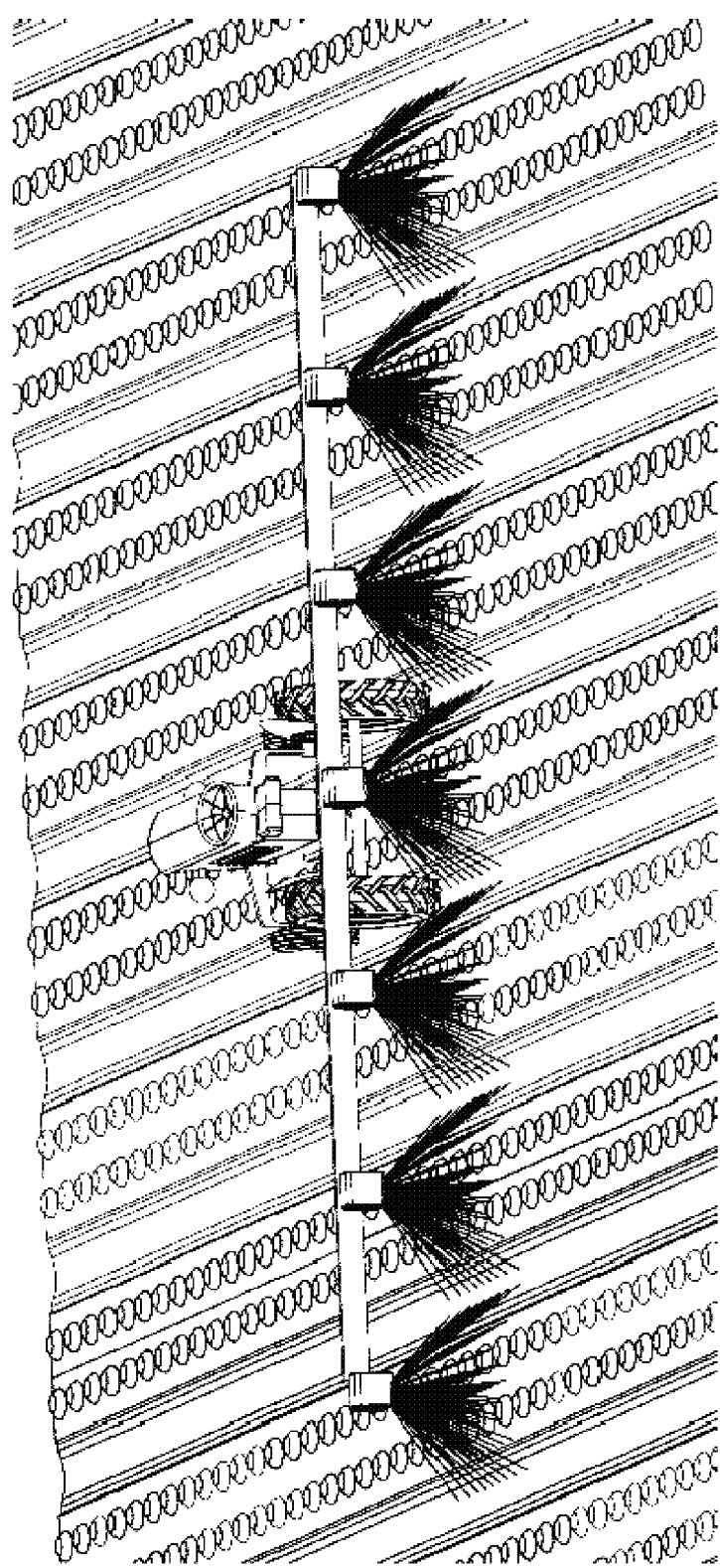
FIG. 24 is a schematic view of a further embodiment of the invention, in which seven automated target recognition and fluid projectile dispensing apparatuses are mounted to a boom of a ground-based vehicle.

FIG. 22 is a schematic view of the ground-based vehicle of FIG. 20 adapted for remote wireless, and optionally offsite, communication with an operator via an electronic tablet device (95).

In further embodiments, the apparatus may be attached to a fixed base station, optionally networked with a plurality of like base stations disposed in predetermined spaced apart relationship with overlapping target areas, and operating in concert to provide effective coverage of a defined environment.

Aspects of the sensing, mapping, and targeting mechanisms and processes will now be described in more detail. It should be understood in this context that the various systems, procedures and alternatives outlined can be adapted in various combinations and permutations for use in different embodiments of the invention and for different functions and applications.

In one preferred targeting calibration routine, the apparatus initially shoots a liquid jet or projectile at a calibration target. The area where the fluid makes contact with the calibration target is then sensed using imaging sensors and this data is fed into the calibration system. The calibration system then determines the difference between the desired and actual strike areas, to discern the state of the system, and the direction and magnitude of error correction (if any) required. This process may be repeated several times and at various points within the actuation and sensing space as required, in order to calibrate the system to within defined tolerances. This routine may be run live, in real time on actual targets, or as a dedicated calibration process prior to deployment on actual targets. More sophisticated embodiments may also incorporate machine learning algorithms, whereby targeting accuracy is continually monitored and iteratively refined over time.

Manual calibration routines are also envisaged, whereby for example, the targeting mechanism may be manually positioned such that the liquid jet stream hits one or more target objects of known position within the sensed image (for example target objects at the corners of a rectangle, grid, or a checkerboard, etc.) thereby to permit generation of a digital map correlating pixels in the sensed image with joint angles within the targeting mechanism.

In one preferred embodiment, the control liquid has high contrast characteristics, so that it is readily sensed by the imaging sensors (which may operate in the visible, ultraviolet, infrared or other spectrums). In one embodiment, additives such as visual or UV colourings are used, so that compatible sensors can readily discern the fluid strike area from the surrounding environment. In other embodiments, the control liquid may be heated or cooled, for example, to enhance contrast in the infrared spectrum relative to the surrounding environment, thereby facilitating accurate detection by infrared sensors.

In preferred embodiments, the control system also includes a prioritisation algorithm for prioritisation of targets for the apparatus. In one form, the prioritisation algorithm is based on a relatively simple "first-in-first-out" (FIFO) prioritisation strategy. In other embodiments, however, additional optimisation parameters may be incorporated into the control strategy, including any one or more of:
angle of attack,
vehicle velocity or other motion quantities,
nozzle velocity or other motion quantities,
target velocity or other motion quantities,
time or distance required for the targeting mechanism to reach the firing position,
projectile travel distance,
errors in measurement,
gravitational effects,
dispersive effects of the spray pattern,
historical inputs derived from system performance in comparable situations,
estimated probability of a missed target (e.g. based on range, wind conditions, potential obstacles and other measured or calculated variables),
related consequences (e.g. inadvertently hitting a neighbouring plant rather than a targeted weed with pesticide),
opportunity value parameters,
size of target,
etc.

The control system preferably also includes a strategy for global registration, whereby global coordinates of each target are estimated using one or more sensors. In one embodiment, this strategy records a centre position for each target that has been "shot", and verifies that any subsequently identified target is beyond a predetermined minimum distance, (for example, an error or exclusion zone defined within an error circle, ellipse or other geometrical boundary) from those targets. Potential targets within those error or exclusion zones are then disregarded in favour of the next target. The dimensions of these error or exclusion zones may be fixed or variable, around the recorded or calculated centre position or centreline for each target, according to predetermined input parameters.

In more sophisticated embodiments, the control algorithm includes a methodology for dynamically determining, assigning and storing for each target a unique error or exclusion zone, based on real-time data relating to specify inputs such as errors in imaging, real time kinematic (RTK) data, odometry, ground or satellite based augmentation information (GBAS or SBAS), ranging data, and the like.

In other embodiments, optimal flow and visual odometry techniques may be used to facilitate position and estimation of targets and the vehicle. This may be particularly useful where ground based odometry (e.g. wheel encoders) is unavailable, for instance as in UAVs. This may also be applicable for applications involving statistical estimation techniques.

In some embodiments, the targeting mechanism, optionally including a robotic arm and/or a supporting vehicle as described above, incorporates multiple redundant degrees of freedom, to provide additional flexibility in terms the spatial location of the fluid outlet upon delivery of each jet or shot, the orientation of the outlet orifice in that location, and the path from that location to the next firing position. It will be appreciated that redundant degrees of freedom may complicate the control strategy, but also provide substantial additional flexibility and functionality. The optimal balance between simplicity, cost, weight and functionality will depend upon the intended application and related technical and commercial considerations.

Figure 13:
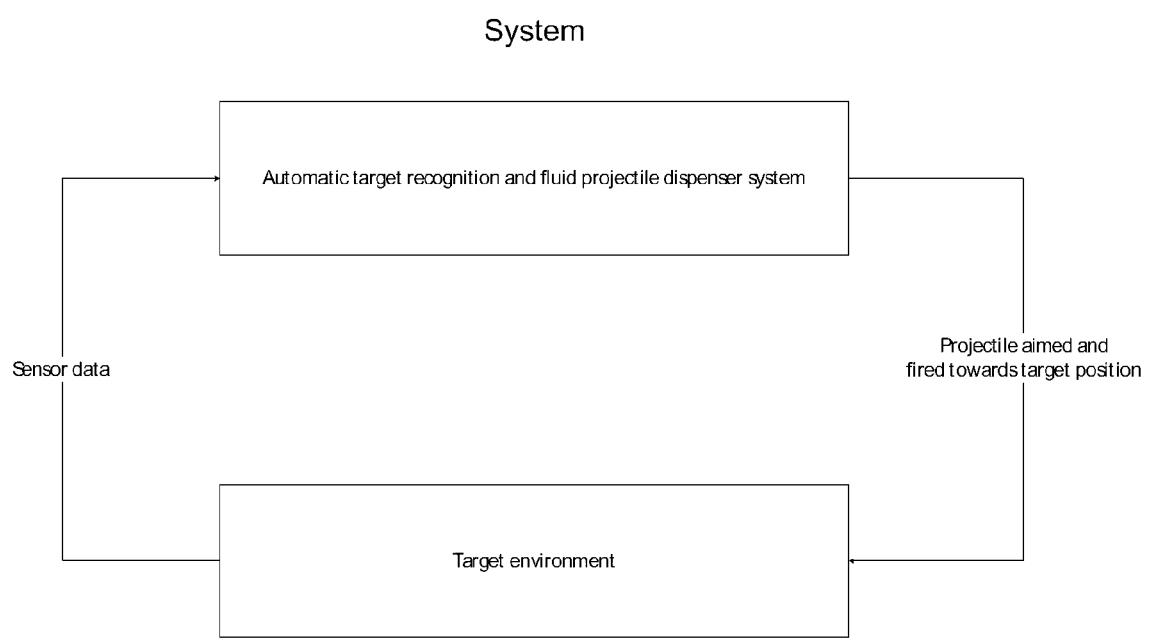
FIG. 13 is a flowchart showing an example of the high-level control logic according to one preferred implementation of the automated target recognition and fluid projectile dispensing system of the invention.

A simple flowchart of a high-level control strategy is shown in FIG. 13, which should be understood in the context of the systems, apparatus and methods and techniques outlined above. In its most basic form, with some details omitted, the system logic in broad overview is as follows:
  evaluation of target environment,
  generation of sensor data based on target environment,
  activation of automatic target recognition and fluid projectile dispensing system, including the intelligence to make decisions around the targeting process. Here, the system can detect, classify and determine where to fire, what to fire, when to fire, and how much to fire for example by incorporating predefined rules, high level instructions or as part of a learning algorithm with specific optimisation parameters such as optimising economic factors (e.g. yield, time taken etc.),
  aiming and firing projectile at target position,
  re-evaluation of target environment, and
  generation of new sensor data.

Figure 14:
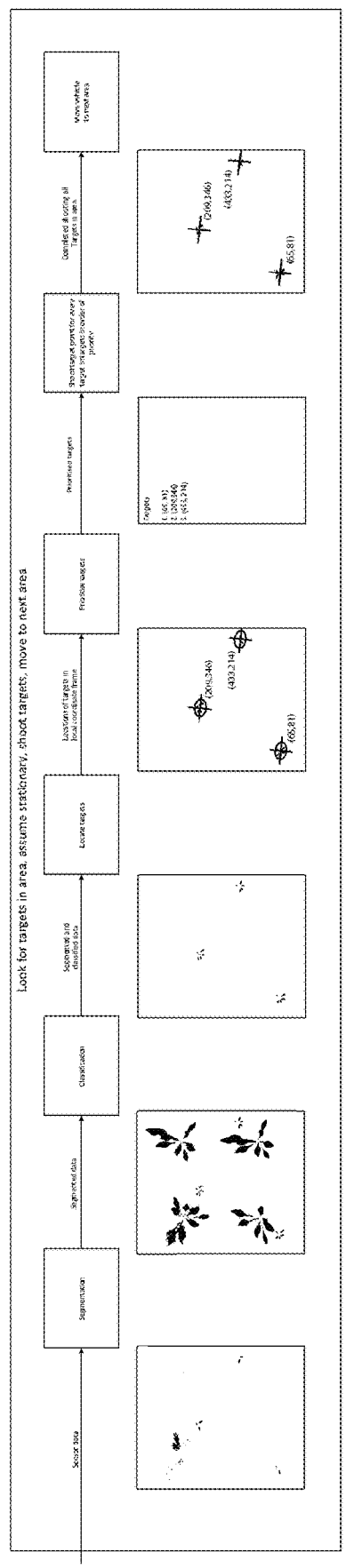
FIG. 14 is a flowchart showing aspects of the control logic in more detail for segmentation, classification, target location, target prioritisation, and target acquisition (or shooting) according to one embodiment of the invention.

The flowchart of FIG. 14 illustrates in more detail one example of a methodology for target identification and acquisition within a defined target environment. This relatively basic system looks for targets in the initial area, assumes the vehicle is stationary, shoots the identified targets, and moves to the next area. The system involves a classifier with weeds, crops and ground as the classes. Since this particular system assumes the apparatus is stationary, it will be more relevant to ground vehicles than UAVs. The methodology in broad overview is as follows:
  segmentation of sensor data from initial target area,
  classification of segmented data,
  location of targets based on segmented and classified data,
  prioritisation of targets based on locations of targets in local coordinate frame,
  shooting target points for each target in order of priority, and
  moving vehicle to next target area, when shooting of all targets in previous target area completed.

Figure 15:
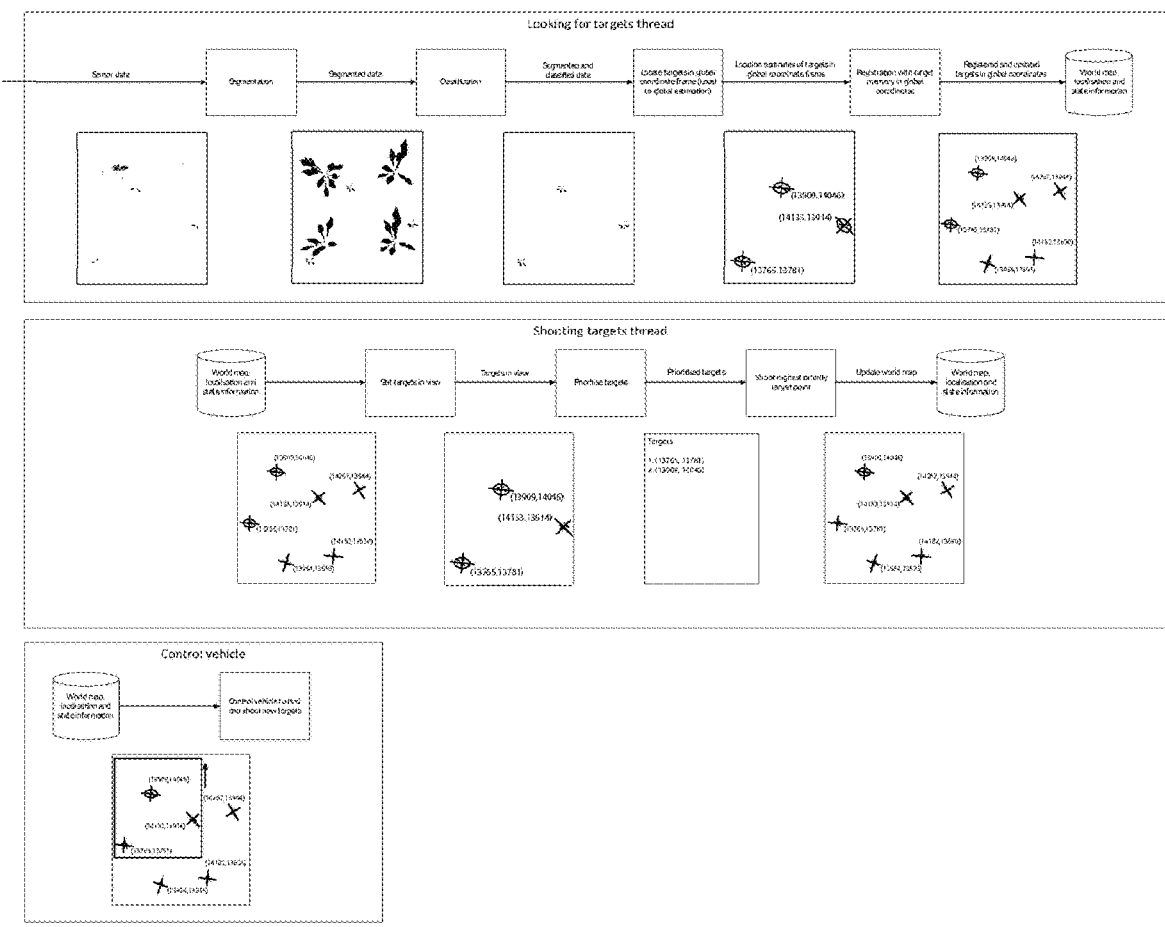
FIG. 15 is a flowchart showing aspects of the control logic in more detail, broken down into discrete components or threads for target location, target shooting, and vehicle control according to an embodiment of the invention.

FIG. 15 shows a more detailed example of a more sophisticated methodology for target identification and acquisition, in conjunction with vehicle control, broken down into corresponding discrete component modules or threads for ease of illustration. This system is able to classify in the same way as the previous example, but is also able to take local object positions and register to a global coordinate system. This allows the system to track what tasks have and have not been completed in a world map. It could be practically modelled on a 2-D or 2.5-D map. The methodology in broad overview is as follows:
Looking for Targets
  segmentation of sensor data,
  classification of segmented data,
  location of targets in local coordinate frame (local to global estimation) based on segmented and classified data,
  registration of targets with target memory in global coordinates, based on location estimates of targets in global coordinate frame, and
  generation of "world map", including localisation and state information, based on registered and updated targets in global coordinates.
Shooting Targets
  establishing targets in view based on world map,
  prioritising targets based on targets in view,
  shooting highest priority target point based on target prioritisation, and
  updating world map.
Controlling Vehicle
  controlling vehicle to find and shoot new targets (see above), based on world map incorporating localisation and state information. The control of the vehicle (e.g. velocity, position, heading etc.) may be partially or fully controlled by the shooting system. For example, the throttle of the vehicle may be proportionally controlled based on the number of targets remaining in view, as well as their locations within the target region (i.e. if a target that needs to be shot is about to go out of view, then the vehicle will be told to slow or stop by the shooting system).

Figure 16:
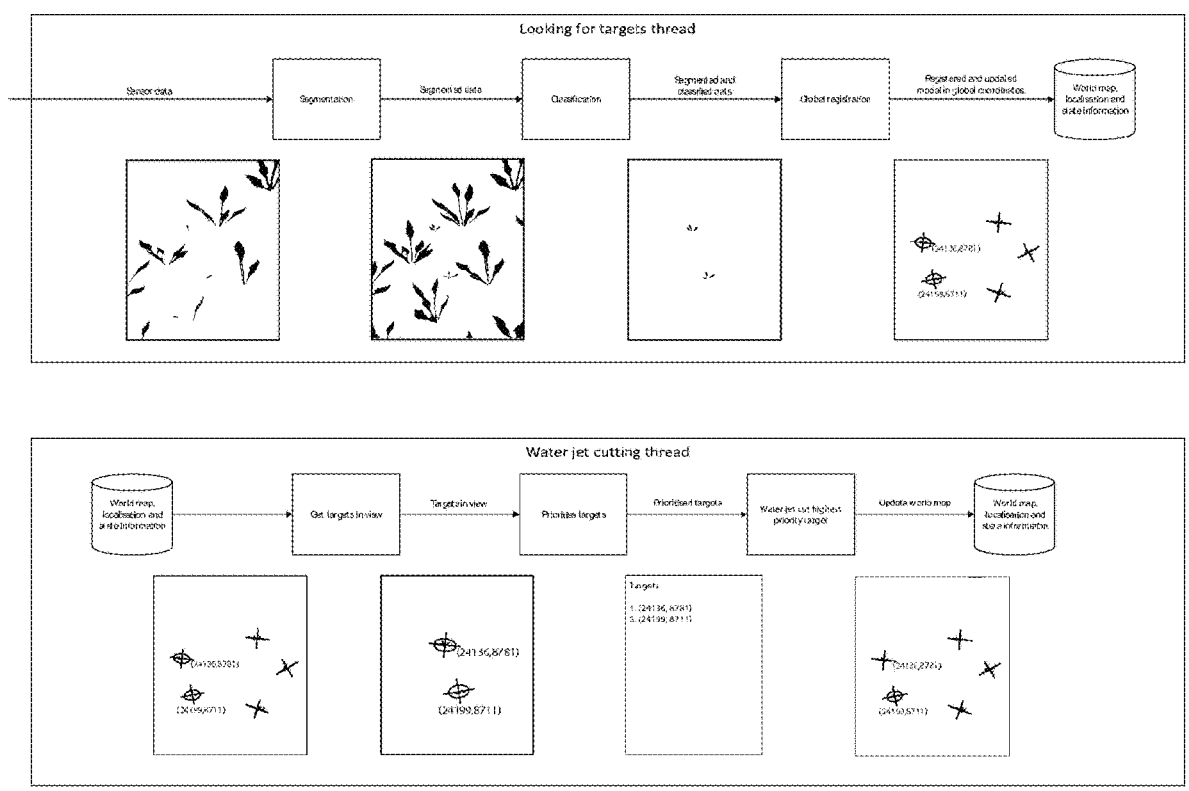
FIG. 16 is a flowchart showing aspects of the control logic in more detail, broken down into discrete components or threads for searching for targets and water jet cutting of targets according to an embodiment of the invention.

FIG. 16 shows a flowchart of a further example, with threads for target identification and water jet cutting. This system is similar in functionality to the previous example, but is ideally modelled as a 3-D map (although a 2.5-D map could also be used). It would be useful in applications requiring the apparatus to shoot under leaves to target, for example. The methodology in broad overview is as follows:
Looking for Targets
  segmentation of sensor data,
  classification of segmented data
  global registration based on segmented and classified data, and
  generation of world map including localisation and state information, based on registered and updated model in global coordinates.
Water Jet Cutting
  establishing targets in view based on world map,
  prioritising targets based on targets in view,
  water jet cutting of highest priority target based on target prioritisation, and
  updating world map with updated localisation and state information.

Figure 17:
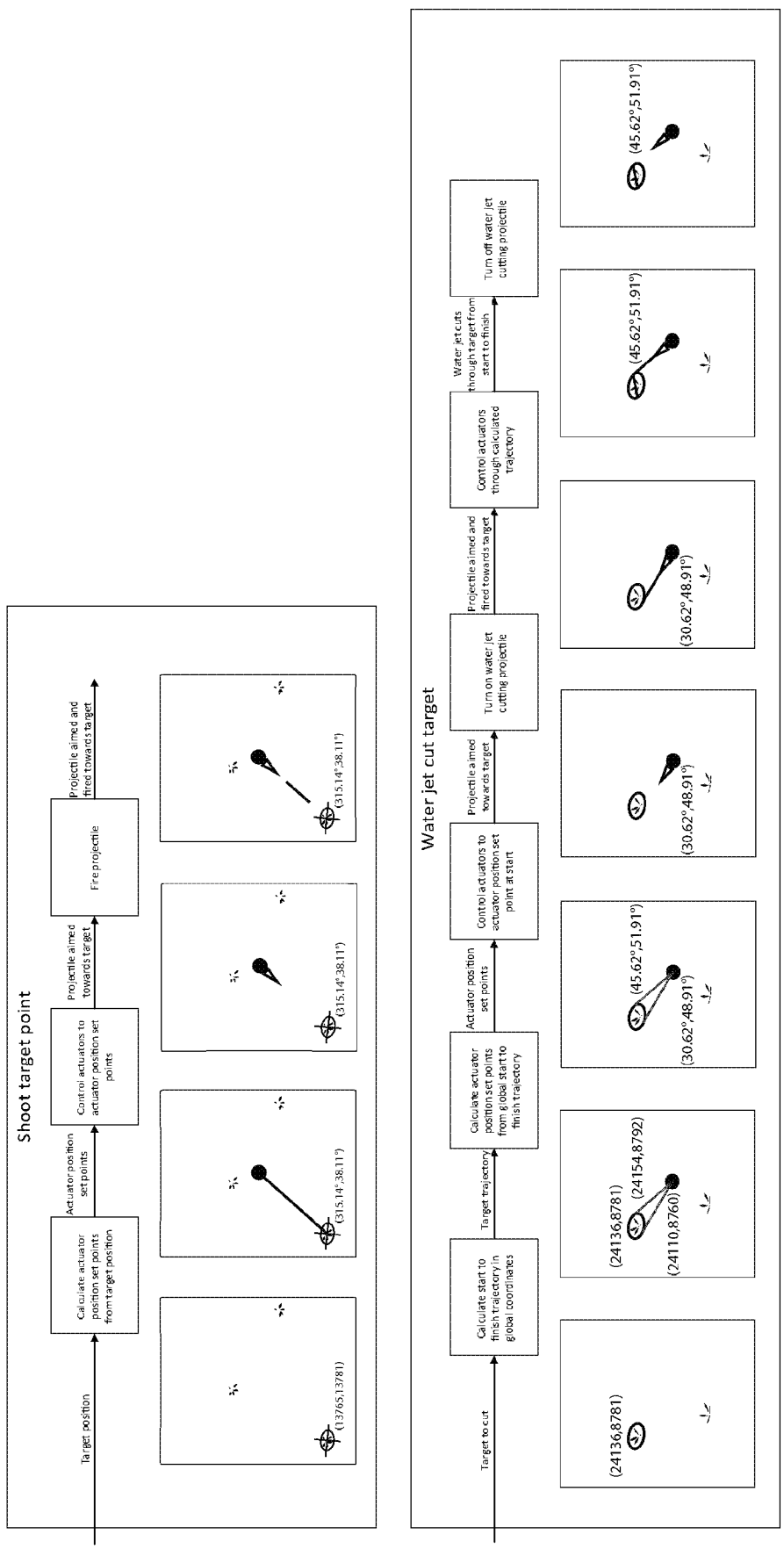
FIG. 17 is a further flowchart showing aspects of the control logic in more detail, broken down into discrete components or threads for shooting at point targets and water jet cutting of targets, these functions being common to multiple embodiments of the invention.

FIG. 17 includes further flowcharts showing in more detail the respective control threads for shooting point targets and water jet cutting targets. These are common functions applicable as appropriate to the examples outlined above.
Shooting Target Points
  calculate actuator position set points based on target position, control actuators to actuator position set points, and
shoot liquid projectile, when aimed at target based on actuators in position.

Water Jet Cutting of Targets
calculate start to finish trajectory in global coordinates based on identification of target to cut,
calculate actuator position set points based on start to finish trajectory calculated in global coordinates,
control actuators to actuator position set point at start position based on calculated set points,
turn on water jet cutting projectile when aimed at start position,
control actuators through calculated trajectory, and
turn off cutting projectile, after water jet cuts through target from start to finish positions.

It will be appreciated that other preferred methodologies may be employed, additional to those outlined above in relation to the accompanying flow charts, in order to customise the targeting system for a desired application. For example, if the vehicle is travelling in an environment at a particular velocity and the shooting system aims to shoot at the next target, an algorithm can be employed whereby it predicts the spatiotemporal trajectories of both the vehicle, nozzle and the projectile in order to hit the target with some acceptable level of error in the precision. Such error bounds need not be constant, and may be (manually or automatically) adjusted with a suitable algorithm depending on the precision required for a given application. For example, the error bounds established for shooting droplets at relatively small targets with a toxic herbicide may be smaller when compared to the error bounds established for shooting droplets at relatively large targets with a relatively safe fluid (e.g. water). Such an algorithm may be used to determine when to trigger the jet to ensure that error constraints are satisfied and the target is hit.

The implementation of these control strategies under the rules, guidelines, procedures and objectives as outlined herein will be well within the capabilities of those skilled in the art, and so need not be described in more detail. It will be equally understood that various additional, complementary or alternative control strategies and methodologies may be utilised for particular applications, within the scope of the inventive concepts as described. For example, it is envisaged that the step of segmentation could be omitted with the use of a classifier based directly from the sensor data. By way of further example, the registration of features in space and time between local and global frames of reference need not necessarily be discretised, as may be applicable to data fusion based approaches involving statistical filtering and estimation techniques (e.g. Kalman filter or particle filter).

It should also be understood that various refinements of the broad control strategies outlined above are envisaged. For example, in some embodiments, the classification process may be used to differentiate between different targets of different size, and this data may be used to determine the precise amount of herbicide in the case of weeds, or pesticide in the case of insects, and also the optimal spray pattern to be deployed in each targeted shot. Similarly, the automated classification of weeds or other pests into different categories or types may be used as a basis to determine the quantity and/or type of herbicide, pesticide or other control liquid to be deployed.

The invention in its various aspects and especially in its preferred embodiments provides a number of inherent and unique advantages. In particular, the precise targeting of discrete liquid projectiles or short bursts of liquid jets virtually eliminates the wastage that is inevitably associated with blanket spraying or even semi-targeted or directed spraying or other dispersion techniques, and thereby enables relatively small and in some cases minute dosages of control liquids to be used. Thus, in its preferred embodiments, the present invention advantageously provides an intelligent, automated micro-dosing system and apparatus which can significantly reduce chemical usage in agricultural environments, reducing capital stock outlay and giving rise to associated commercial benefits.

This in turn enables the use of a much broader spectrum of mobile delivery vehicles and techniques that would not hitherto hath been possible or practically viable, including particularly delivery via UAV, due to the sheer weight of the liquids required to be carried using previously known delivery techniques. In many cases, the use of more concentrated or more effective chemicals will also be possible, because the risks of contamination from excess overspray, run-off or imprecise targeting are dramatically reduced, if not substantially eliminated. Aside from the commercial advantages, this also offers the potential for environmental and health benefits. The ability to utilise the directed energy as well as the chemical composition of different control liquids also offers potential for significant economic, environmental, agricultural and health benefits. In these and other respects, the invention represents a practical and commercially significant improvement over the prior art.

Although the invention has been described with reference to specific examples, it will be appreciated by those skilled in the art that the invention may be embodied in many other forms.

The invention claimed is:

1. An apparatus for projecting a control agent toward a target, the apparatus including:
a source of the control agent adapted for use in connection with an environmental control function;
an outlet incorporating at least one outlet orifice adapted to direct the control agent emanating from the outlet orifice toward a target;
a control valve selectively movable between an operative mode in which the outlet is effectively open and an inoperative mode in which the outlet is effectively closed;
an outlet support assembly movable on at least one independent control axis for selectively orienting the outlet orifice and thereby orienting the control agent emanating from the outlet orifice in the operative mode;
one or more actuators to effect movement of the outlet support assembly about the control axis;
a first sensor for sensing aspects of an environment and generating data indicative thereof, wherein the first sensor is fixed relative to the at least one independent control axis;
a classification device for identifying targets within the environment on the basis of the data from the first sensor; and
a controller adapted to orient the outlet orifice toward the targets with the one or more actuators and to select the operative mode of the control valve in accordance with a predetermined control logic;
thereby to project a beam or a jet of the control agent toward the identified targets for the purposes of the environmental control function;
wherein the first sensor is substantially co-located with the outlet such that a ray projected from the sensor is substantially co-linear with a jet path and the projected beam or jet of the control agent is within a field of view of the first sensor.

2. An apparatus according to claim 1, wherein the outlet support assembly is movable on at least two independent control axes, whereby the actuators effect movement of the outlet support assembly about the respective control axes.

3. An apparatus according to claim 1, wherein the control agent is a pressurised control fluid, and the apparatus further includes a fluid inlet for connection to the pressurised source of pressurised control fluid, and a fluid outlet incorporating the at least one outlet orifice.

4. An apparatus according to claim 1, wherein the environmental control function is the growth of a selected agricultural plant or crop, or the control or eradication of a targeted pest.

5. An apparatus according to claim 1, wherein the target is a plant, or the soil immediately below or surrounding the plant, wherein the control agent is water for irrigation or a liquid fertiliser to enhance growth of the plant.

6. An apparatus according to claim 1, wherein the target is a pest and the control agent is a pesticide adapted to selectively control the population of the pest when targeted.

7. An apparatus according to claim 1, wherein the target is effectively eradicated or displaced by the energy of the control agent.

8. An apparatus according to claim 1, wherein, during each firing sequence, a duration of the operative mode of the control valve is such that the jet takes the form of an airborne projectile of a control fluid.

9. An apparatus according to claim 1, wherein, during each firing sequence, a duration of the operative mode of the control valve is such that the jet takes the form of a semi-continuous stream of a control fluid.

10. An apparatus according to claim 1, wherein the apparatus includes a second sensor for sensing in real time the position and orientation of the outlet orifice, as part of a feedback control loop.

11. An apparatus according to claim 1, wherein a plurality of orifices are incorporated into the outlet.

12. An apparatus according to claim 11, wherein different orifices are adapted to deliver different control fluids and/or the targets for the respective orifices are different.

13. An apparatus according to claim 1, wherein the apparatus is attached to or integrated with an unmanned aerial vehicle (UAV).

14. An apparatus according to claim 1, wherein the apparatus is attached to or integrated with a mobile ground-based vehicle adapted to traverse successive rows of crops.

15. An apparatus according to claim 1, wherein the apparatus attached to a fixed base station.

16. An apparatus according claim 1, wherein the outlet support assembly includes additional degrees of freedom, to provide more flexibility for positioning and orienting the fluid outlet.

17. An apparatus according claim 1, wherein the outlet support assembly is configured as an end effector of a multi-DoF (multiple degrees of freedom) robotic arm, with the robotic arm providing at least one kinematic degree of freedom at each of a plurality of revolute joints, connected by intermediate links.

18. An apparatus according to claim 1, including a calibration system operating a calibration routine to determine the state of the system, and the direction and magnitude of any error correction required.

19. An apparatus according to claim 1, wherein the controller includes a prioritisation algorithm for prioritisation of targets for the apparatus.

\* \* \* \* \*